(12) United States Patent
Park et al.

(10) Patent No.: US 10,763,503 B2
(45) Date of Patent: Sep. 1, 2020

(54) COMPOSITE CATHODE ACTIVE MATERIAL, CATHODE AND LITHIUM BATTERY INCLUDING THE COMPOSITE CATHODE ACTIVE MATERIAL, AND METHOD OF PREPARING THE COMPOSITE CATHODE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Junho Park, Seoul (KR); Kwangjin Park, Seongnam-si (KR); Youhwan Son, Seongnam-si (KR); Kanghee Lee, Suwon-si (KR); Sukgi Hong, Seongnam-si (KR); Byungjin Choi, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 182 days.

(21) Appl. No.: 15/876,410

(22) Filed: Jan. 22, 2018

(65) Prior Publication Data
US 2018/0316009 A1    Nov. 1, 2018

(30) Foreign Application Priority Data
Apr. 28, 2017    (KR) .................. 10-2017-0055758

(51) Int. Cl.
*H01M 4/52* (2010.01)
*H01M 4/525* (2010.01)
(Continued)

(52) U.S. Cl.
CPC ............ *H01M 4/525* (2013.01); *C01D 15/02* (2013.01); *H01M 4/131* (2013.01);
(Continued)

(58) Field of Classification Search
CPC .... H01M 4/131; H01M 4/1391; H01M 4/366; H01M 4/505; H01M 4/525; H01M 10/0525; C01D 15/02
See application file for complete search history.

(56) References Cited

U.S. PATENT DOCUMENTS

| | | | |
|---|---|---|---|
| 2005/0079417 A1* | 4/2005 | Kim ................. | H01M 4/485 429/231.2 |
| 2014/0045067 A1* | 2/2014 | Cho ................. | H01M 4/485 429/220 |

(Continued)

FOREIGN PATENT DOCUMENTS

| | | |
|---|---|---|
| KR | 1020080013822 A | 2/2008 |
| KR | 1020090013841 A | 2/2009 |
| KR | 1020160081692 A | 7/2016 |

OTHER PUBLICATIONS

Banerjee et al., "MOF-derived crumpled-sheet-assembled perforated carbon cuboids as highly effective cathode active materials fro ultra-high energy density Li-ion hybrid electrochemical capacitors (Li-HECs)*", Nanoscale, 6, 2014, 4387.

(Continued)

*Primary Examiner* — Amanda C. Walke
(74) *Attorney, Agent, or Firm* — Cantor Colburn LLP

(57) ABSTRACT

A composite cathode active material, and a cathode and a lithium battery each including the composite cathode active material. The composite cathode active material includes: a core including a first lithium transition metal oxide represented by Formula 1, $$Li_aMO_2$$

wherein, in Formula 1, M includes Ni and at least one non-nickel Group 4 to Group 13 element, a content of Ni is about 70 mol % or greater, based on a total content of M, $0.9 \leq a \leq 1.1$, and wherein the first lithium transition metal (Continued)

oxide has a layered crystal structure belonging to an $R\bar{3}m$ space group; and a shell on a surface of the core, the shell having a spinel crystal structure and including a dopant.

26 Claims, 21 Drawing Sheets

(51) Int. Cl.
*H01M 10/0525* (2010.01)
*H01M 4/1391* (2010.01)
*H01M 4/131* (2010.01)
*H01M 4/36* (2006.01)
*C01D 15/02* (2006.01)
*H01M 4/02* (2006.01)
*H01M 4/505* (2010.01)

(52) U.S. Cl.
CPC ......... *H01M 4/1391* (2013.01); *H01M 4/366* (2013.01); *H01M 10/0525* (2013.01); *C01P 2002/01* (2013.01); *C01P 2002/32* (2013.01); *C01P 2002/72* (2013.01); *C01P 2002/82* (2013.01); *C01P 2002/88* (2013.01); *H01M 4/505* (2013.01); *H01M 2004/028* (2013.01); *H01M 2300/0088* (2013.01)

(56) References Cited

U.S. PATENT DOCUMENTS

| | | | |
|---|---|---|---|
| 2014/0197357 A1* | 7/2014 | Ofer | H01M 4/364 252/182.1 |
| 2015/0044553 A1 | 2/2015 | Chen | |
| 2016/0190571 A1 | 6/2016 | Lee et al. | |
| 2017/0062816 A1* | 3/2017 | Son | H01M 4/485 |
| 2018/0190976 A1* | 7/2018 | Blangero | C01G 51/42 |
| 2019/0006669 A1* | 1/2019 | Park | H01M 4/0471 |

OTHER PUBLICATIONS

Peng et al., "Triphenylamine based Metal-Organic Frameworks as Cathode Materials in Lithium Ion Batteries with Coexistence of Redox Active sites, High working voltage, and High rate stability", Applied Materials & Interfaces, 2016, pp. 1-27.

Sing et al., "Reporting Physisorption Data for Gas/Solid Systems", International Union of Pure and Applied Chemistry, vol. 57, No. 4, 1986, pp. 603-619.

Zhang et al., Monitoring the Solid-state Electrochemistry of Cu(2,7-AQDC) (AQDC=anthraquinone dicarboxylate) in a Lithium Battery: Coexistence of Metal and Ligand Redox Activities in a Metal-Organic Framework, Journal of the American Chemical Society, 2014, p. 1-6.

* cited by examiner

COMPOSITE CATHODE ACTIVE MATERIAL, CATHODE AND LITHIUM BATTERY INCLUDING THE COMPOSITE CATHODE ACTIVE MATERIAL, AND METHOD OF PREPARING THE COMPOSITE CATHODE ACTIVE MATERIAL

CROSS-REFERENCE TO RELATED APPLICATION

This application claims priority to and the benefit of Korean Patent Application No. 10-2017-0055758, filed on Apr. 28, 2017, in the Korean Intellectual Property Office, and all the benefits accruing therefrom under 35 U.S.C. § 119, the content of which is incorporated herein in its entirety by reference.

BACKGROUND

1. Field

The present disclosure relates to a composite cathode active material, a cathode, and a lithium battery, each including the composite cathode active material, and a method of preparing the composite cathode active material.

2. Description of the Related Art

To the need for devices having a smaller size and higher performance, it would be desirable to manufacture lithium batteries that have high energy density, a small size, and a low weight. That is, lithium batteries of high capacity have become important.

To implement a lithium battery according to the above-described applications, research has been carried out on cathode active materials having high capacity. A nickel-based cathode active material may lead to poor lifetime characteristics and poor thermal stability due to a side reaction caused by a high content of residual surface lithium and mixing of cations.

Therefore, there is a need for a method of preventing performance deterioration in a battery including a nickel-based cathode active material.

SUMMARY

Provided is a composite cathode active material which may prevent performance deterioration of a battery by inhibiting a side reaction on a surface of a composite cathode active material.

Provided is a cathode including the composite cathode active material.

Provided is a lithium battery including the cathode.

Provided is a method of preparing the composite cathode active material.

Additional aspects will be set forth in part in the description which follows and, in part, will be apparent from the description, or may be learned by practice of the presented embodiments.

According to an aspect of an embodiment, a composite cathode active material includes: a core including a first lithium transition metal oxide represented by Formula 1

$$Li_aMO_2 \quad \text{Formula 1}$$

wherein, in Formula 1, M includes Ni and at least one non-nickel Group 4 to Group 13 element, wherein a content of Ni is about 70 mole percent or greater, based on a total content of M, $0.9 \leq a \leq 1.1$, and wherein the first lithium transition metal oxide has a layered crystal structure belonging to an $R\bar{3}m$ space group; and a shell on a surface of the core, the shell having a spinel crystal structure and including a dopant.

Also disclosed is composite cathode active material including: a core including a first lithium transition metal oxide represented by Formula 1

$$Li_aMO_2 \quad \text{Formula 1}$$

wherein, in Formula 1, M includes Ni and at least one non-nickel Group 4 to Group 13 element, wherein a content of Ni is about 70 mole percent or greater, based on a total content of M, and $0.9 \leq a \leq 1.1$, wherein the first lithium transition metal oxide has a layered crystal structure belonging to an $R\bar{3}m$ space group; and a shell on a surface of the core, the shell having a spinel crystal structure and including a dopant, and wherein a sum of peak intensities defined as (Dopant peak intensity+Co peak intensity)/(Mn peak intensity)

before and after $Ar^+$ sputtering when analyzed by surface X-ray photoelectron spectroscopy of the composite cathode active material is about 5 or greater.

According to an aspect of an embodiment, a cathode includes the composite cathode active material.

According to an aspect of an embodiment, a lithium battery includes the above-described cathode, an anode, and an electrolyte between the cathode and the anode.

According to an aspect of an embodiment, a method of preparing a composite cathode active material includes: mixing a metal-organic framework and a first lithium transition metal oxide represented by Formula 1 to prepare a mixture $$Li_aMO_2 \quad \text{Formula 1}$$

wherein, in Formula 1, M includes Ni and at least one non-nickel Group 4 to Group 13 element, a content of Ni is about 70 mol % or greater, based on a total content of M, and $0.9 \leq a \leq 1.1$, wherein the first lithium transition metal oxide has a layered crystal structure belonging to an $R\bar{3}m$ space group; and thermally treating the mixture under an oxidizing atmosphere at about 650° C. to about 800° C. for about 3 hours to about 20 hours to prepare the composite cathode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
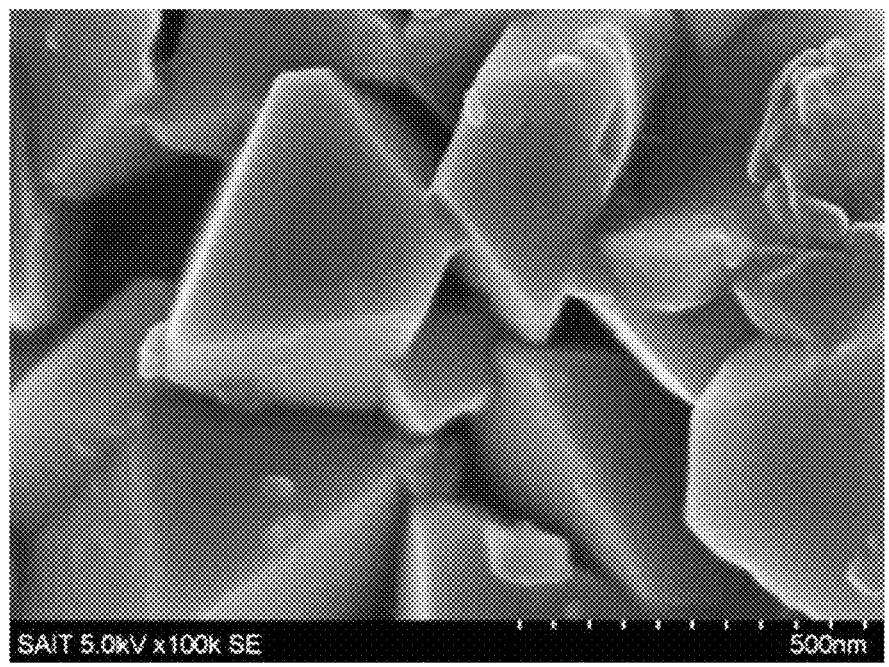
FIG. 1A is a scanning electron microscope ("SEM") image of a surface of a composite cathode active material prepared in Example 4.

The present inventive concept will now be described more fully with reference to the accompanying drawings, in which example embodiments are shown. The present inventive concept may, however, be embodied in many different forms, should not be construed as being limited to the embodiments set forth herein, and should be construed as including all modifications, equivalents, and alternatives within the scope of the present inventive concept; rather, these embodiments are provided so that this inventive concept will be thorough and complete, and will fully convey the effects and features of the present inventive concept and ways to implement the present inventive concept to those skilled in the art.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the size or thickness of each layer, region, or element may be exaggerated or reduced for better understanding or ease of description, and thus the present inventive concept is not limited thereto. Throughout the written description and drawings, like or similar reference numbers and labels will be used to denote like or similar elements. It will also be understood that when an element such as a layer, a film, a region, or a component is referred to as being "on" another layer or element, it can be "directly on" the other layer or element, or intervening layers, regions, or components may also be present. Although the terms "first", "second", etc., may be used herein to describe various elements, components, regions, and/or layers, these elements, components, regions, and/or layers should not be limited by these terms. These terms are used only to distinguish one component from another, not for purposes of limitation.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate is a discharge rate of a cell, and is obtained by dividing a total capacity of the cell by a total discharge period of time of 1 hour, e.g., a C rate for a battery having a discharge capacity of 1.6 ampere-hours would be 1.6 amperes.

Hereinafter, example embodiments of a composite cathode active material, a method of preparing the same, and a cathode and a lithium battery each including the composite cathode active material will be described in further detail.

According to an embodiment, a composite cathode active material includes: a core including a first lithium transition metal oxide represented by Formula 1, the first lithium transition metal oxide having a layered crystal structure belonging to an $R\bar{3}m$ space group; and a shell on a surface of the core or at least adjacent to the surface of the core, the shell having a spinel crystal structure and including a dopant.

$$LiaMO_2 \qquad \text{Formula 1}$$

In Formula 1, M may include Ni and at least one non-nickel Group 4 to Group 13 element, a content of Ni may be about 70 mol % or greater, based on a total content of M, and $0.9 \leq a \leq 1.1$. For example, in Formula 1, $0.95 \leq a \leq 1.05$, $1 \leq a \leq 1.04$, or $1 \leq a \leq 1.03$.

As the composite cathode active material includes the core including a first lithium transition metal oxide, and the shell having a spinel crystal structure and including a dopant, a lithium battery including the composite cathode active material may have improved charge-discharge characteristics. While not wanting to be bound by theory, it is understood that the improved charge-discharge characteristics are due to suppressed deterioration of the composite cathode active material. For example, the shell having a spinel crystal structure may be formed by reaction of the first lithium transition metal oxide and a metal-organic framework ("MOF"). Since residual lithium on a surface of the first lithium transition metal oxide serves as a lithium source during the reaction of the first lithium transition metal oxide and the MOF to form the shell having a spinel crystal structure, the resulting composite cathode active material may have reduced residual lithium content, and a side reaction between the composite cathode active material and an electrolyte solution may be suppressed. As the surface of the first lithium transition metal oxide is coated by the shell having a spinel crystal structure, the side reaction between the first lithium transition metal oxide and the electrolyte solution may be effectively inhibited. Since the shell having a spinel crystal structure, unlike the core having a layered crystal structure, may provide a 3-dimensional ("3-D") lithium ion transfer path, a lithium battery including the composite cathode active material may have a reduced internal resistance and improved cycle characteristics. Due to the reaction of the first lithium transition metal oxide and the MOF, the surface of the first lithium transition metal oxide may be doped with a metal originating from the MOF, and the layered crystal structure of the surface of the first lithium transition metal oxide may be at least partially changed into a spinel crystal structure, thus forming the shell having the spinel crystal structure.

In the first lithium transition metal oxide represented by Formula 1 of the composite cathode active material, the Ni content of M, which includes Ni and at least one non-nickel Group 4 to Group 13 element, may be about 71 mole percent (mol %) or greater, about 75 mol % or greater, about 80 mol % or greater, about 85 mol % or greater, about 90 mol % or greater, or about 95 mol % or greater, e.g., about 71 mol % to about 99 mol %, about 75 mol % to about 98 mol %, or about 80 mol % to about 95 mol %, based on a total content of M. A Ni content of about 70 mol % or greater in the first lithium transition metal oxide may provide high capacity. Therefore, a lithium battery having high capacity may be implemented.

The dopant in the shell having a spinel crystal structure in the composite cathode active material may be at least one non-nickel Group 4 to Group 13 element. The dopant may be selected to provide suitable performance improvement of the composite cathode active material, and for example, may be a transition metal. The dopant may include Co, Zn, Fe, Cu, Ni, Mn, Zr, Ti, Mg, or a combination thereof.

The shell of the composite cathode active material may include a second lithium transition metal oxide represented by Formula 2.

$$Li_{1-x}M''_yM'_zO_2 \qquad \text{Formula 2}$$

In Formula 2, M" may include Ni and at least one non-nickel Group 4 to Group 13 element, M' may be at least one non-nickel Group 4 to Group 13 element, and $0 \leq x \leq 0.05$, $0 \leq z \leq 0.06$, $1.0 \leq (y+z) \leq 1.06$. For example, in Formula 2, $0 \leq x \leq 0.04$, $0 \leq x \leq 0.04$, $0 \leq x \leq 0.03$, $0 \leq x \leq 0.02$, and $0 \leq x \leq 0.01$, and in some embodiments, $0 \leq z \leq 0.05$, $0 \leq z \leq 0.04$, $0 \leq z \leq 0.03$, $0 \leq z \leq 0.02$, and $0 \leq z \leq 0.01$. For example, in Formula 2, the dopant M' may include Co, Zn, Fe, Cu, Ni, Mn, Zr, Ti, Mg, or a combination thereof.

The second lithium transition metal oxide of the composite cathode active material may be electrochemically active. The second lithium transition metal oxide of the composite cathode active material can be oxidized or reduced at a potential of 4.5 volts to 4.8 volts versus Li/Li$^+$. While not wanting to be bound by theory, it is understood that because the second lithium transition metal oxide coated on the layered core is electrochemically active, the composite cathode active material may have increased discharge capacity. Due to having a spinel crystal structure, the second lithium transition metal oxide may provide a 3-D lithium ion transfer path.

The shell of the composite cathode active material may have a thickness of about 100 nanometers (nm) or less, about 90 nm or less, about 80 nm or less, about 70 nm or less, about 60 nm or less, about 50 nm or less, about 40 nm or less, about 30 nm or less, about 20 nm or less, or about 10 nm or less. For example, the shell may have a thickness of about 1 nm or greater or about 5 nm or greater. In an embodiment, the shell has a thickness of about 1 nm to about 100 nm, for example about 5 nm to about 90 nm. When the thickness of the shell is within these ranges, a lithium battery including the composite cathode active material may have further improved cycle characteristics and thermal stability.

The content of the shell in the composite cathode active material may be about 6 weight percent (wt %) or less, about 5 wt % or less, about 4 wt % or less, about 3.5 wt % or less, about 3 wt % or less, about 2.5 wt % or less, about 2 wt % or less, or about 1 wt % or less, based on a total weight of the composite cathode active material. For example, the content of the shell may be about 0.1 wt % or greater or about 0.5 wt % or greater of the total weight of the composite cathode active material. In an embodiment, the content of the shell is about 0.1 wt % to about 6 wt %, or about 0.5 wt % to about 5 wt %. When the content of the shell is within these ranges, a lithium battery including the composite cathode active material may have further improved cycle characteristics and thermal stability.

The spinel crystal structure of the shell may belong to an $Fd\bar{3}m$ space group. Since the spinel crystal structure of the shell belongs to the $Fd\bar{3}m$ space group, a lithium battery including the composite cathode active material may have further improved cycle characteristics and thermal stability.

A peak intensity ratio I(003)/I(104) of a peak of a (003) crystal plane to a peak of a (104) crystal plane in an X-ray diffraction ("XRD") spectrum of the composite cathode active material including the core and the shell may be smaller than a peak intensity ratio I(003)/I(104) of the core including the first lithium transition metal oxide. In an embodiment, a peak intensity ratio of an intensity of a (003) peak to an intensity of a (104) peak of the composite cathode active material may be less than a peak intensity ratio of an intensity of a (003) peak to an intensity of a (104) peak of the core. That is, the composite cathode active material including the core and the shell may have a reduced peak intensity ratio I(003)/I(104) as compared to a peak intensity ratio I(003)/I(104) of the first lithium transition metal oxide. Due to the introduction of the shell having a spinel crystal structure onto the core having a layered crystal structure, a peak intensity I(104) of a peak of the (104) crystal plane from the spinel crystal structure may be relatively increased over a peak intensity I(104) of a peak obtained from core, i.e., the first lithium transition metal oxide, leading to a reduced peak intensity ratio I(003)/I(104) of the composite cathode active material.

A maximum peak value, e.g., intensity, in a Raman spectrum of the composite cathode active material may be at a wavenumber of about 530 inverse centimeters ($cm^{-1}$) or greater, about 532 $cm^{-1}$ or greater, about 533 $cm^{-1}$ or greater, about 534 $cm^{-1}$ or greater, or about 536 $cm^{-1}$ or greater. A maximum peak value in a Raman spectrum of the core including the first lithium transition metal oxide may be at about 510 $cm^{-1}$. However, due to the introduction of the shell having a spinel crystal structure onto the core, a maximum peak shift to about 530 $cm^{-1}$ or greater may occur in the Raman spectrum of the composite cathode active material.

In a surface X-ray photoelectron ("XPS") spectrum of the composite cathode active material, a peak intensity ratio I(530-533)/I(528-530) of a peak at about 530 electron volts (eV) to 533 eV originating from residual surface lithium such as $Li_2CO_3$ or LiOH, to a peak at about 528 eV to about 530 eV originating from oxygen in the crystal structure of the first lithium transition metal oxide, may be about 2 or less, about 1.9 or less, about 1.8 or less, about 1.7 or less, or about 1.6 or less. In an embodiment, a peak intensity ratio of an intensity of a peak at about 530 electronvolts to 533 electronvolts to an intensity of a peak at about 528 electronvolts to about 530 electronvolts in a surface X-ray photoelectron spectrum of the composite cathode active material may be about 0.01 to about 2, or about 0.1 to 1.9. That is, the composite cathode active material may have reduced residual surface lithium content. Due to the reduced residual surface lithium content, a side reaction between the composite cathode active material and an electrolyte may be inhibited.

Figure 1B:
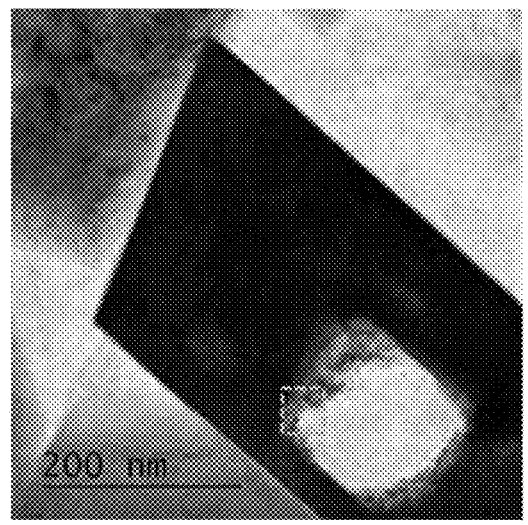
FIG. 1B is a transmission electron microscope ("TEM") image of the surface of the composite cathode active material prepared in Example 4.
Figure 4A:
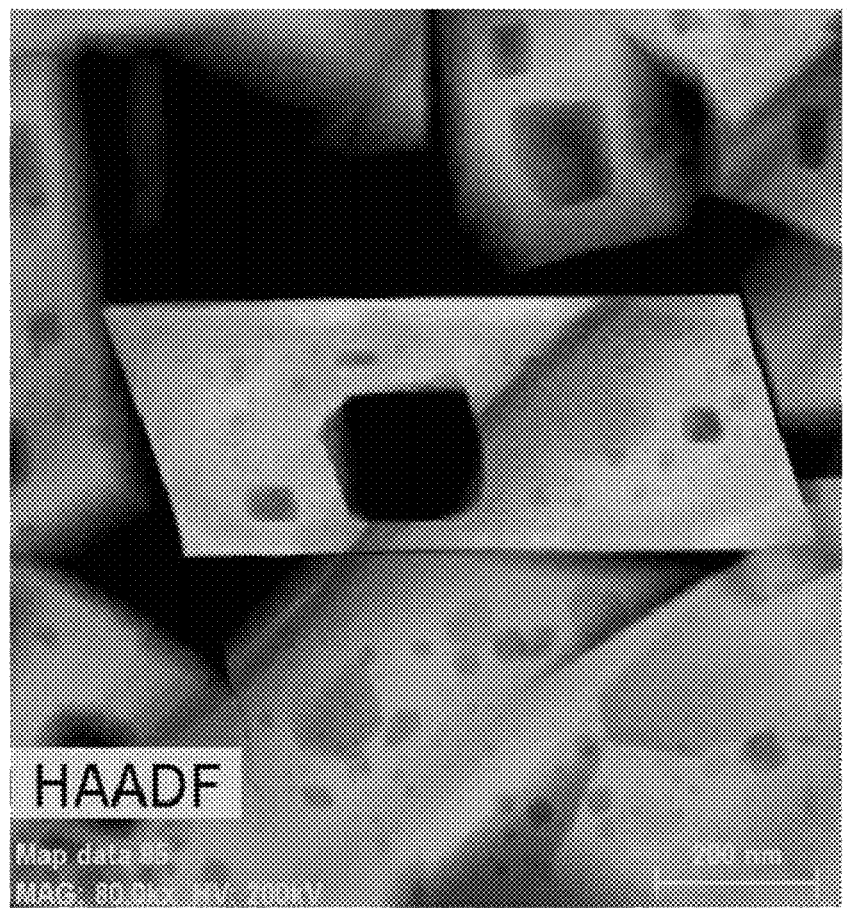
FIGS. 4A to 4C are HAADF TEM images of a surface of the composite cathode active material prepared in Example 4.

Referring to FIGS. 1A to 1E, a composite cathode active material according to an embodiment may include a polyhedral primary particle, and the polyhedral primary particle may include a layered crystal structure and a spinel crystal structure. Referring to FIGS. 1A to 1E and FIGS. 4A to 4C, a primary particle of the composite cathode active material may have a polyhedral structure including a core having the layered crystal structure inside the primary particle, and a shell coated on the surface of the core, the shell including a dopant, for example, cobalt (Co), and having the spinel crystal structure. A polyhedral primary particle is a primary particle having a plurality of faces and a plurality of vertices, and is distinguished from primary particles having spherical or irregular shapes. As shown in FIGS. 1B and 4A, the polyhedral primary particle may be a primary particle having, for example, a rectangular cross-sectional shape.

Figure 4B:
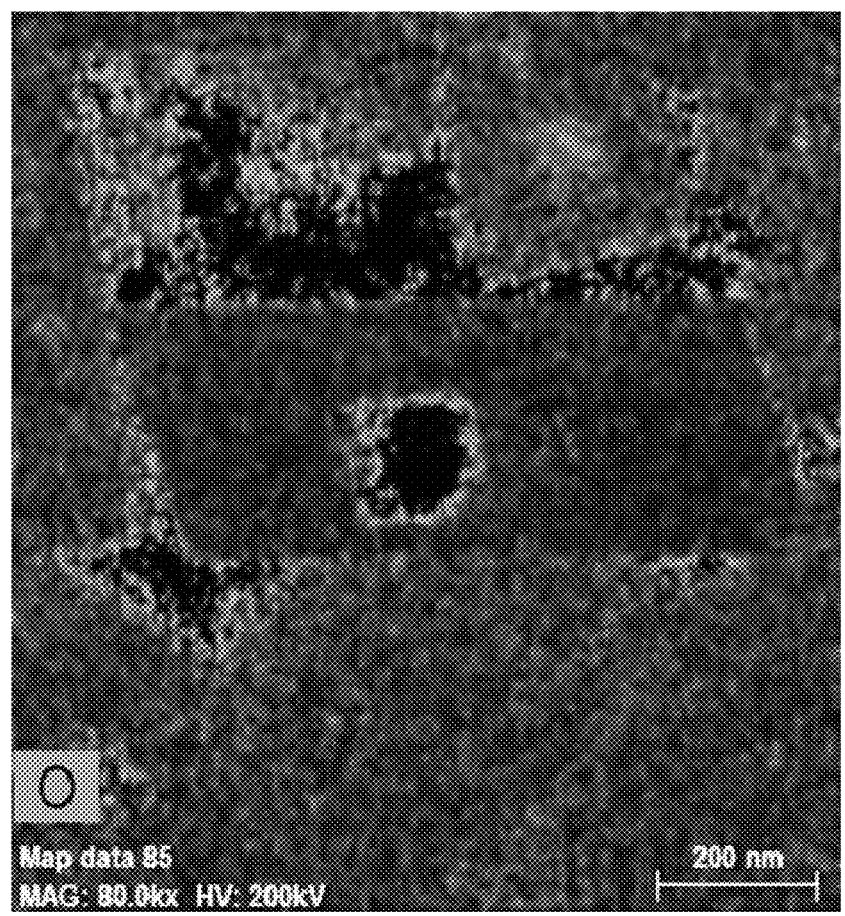

Referring to FIGS. 1B and 4B, the polyhedral primary particle may include a polyhedral pore as a through-hole. A through-hole refers to a pore penetrating through opposite faces of the primary particle. The polyhedral primary particle may include a polyhedral pore having a rectangular cross-sectional shape, the polyhedral pore being distinguished from pores having spherical or irregular cross-sectional shapes.

The composite cathode active material may include a mesopore having a diameter of about 1 nm to about 100 nm, about 2 nm to about 100 nm, about 5 nm to about 100 nm, about 7 nm to about 100 nm, about 10 nm to about 100 nm, about 10 nm to about 90 nm, about 10 nm to about 80 nm, about 10 nm to about 70 nm, or about 10 nm to about 60 nm, and an average volume of the mesopore may be about 0.001 cubic centimeters per gram ($cm^3/g$) or greater, about 0.002 $cm^3/g$ or greater, or about 0.003 $cm^3/g$ or greater. For example, the mesopore may have an average volume of about 0.01 $cm^3/g$ or less, about 0.008 $cm^3/g$ or less, or about 0.006 $cm^3/g$ or less. When the composite cathode active material includes a mesopore having a diameter and an average volume within these ranges, a lithium battery including the composite cathode active material may have further improved cycle characteristics and thermal stability.

Referring to FIG. 1B and FIGS. 4A to 4C, mesopores were found in a primary particle and among different primary particles.

The composite cathode active material may have a Brunauer-Emmett-Teller (BET) specific surface area of about 0.48 square meters per gram ($m^2/g$) or greater, about 0.49 $m^2/g$ or greater, about 0.50 $m^2/g$ or greater, about 0.52 $m^2/g$ or greater, as measured by a nitrogen adsorption method. For example, the composite cathode active material may have a BET specific surface area of about 1.50 $m^2/g$ or less, about 1.40 $m^2/g$ or less, about 1 $m^2/g$ or less, about 0.80 $m^2/g$ or less, or about 0.60 $m^2/g$ or less, e.g., about 0.49 $m^2/g$ to about 1.50 $m^2/g$, or about 0.5 $m^2/g$ to about 1 $m^2/g$. When the composite cathode active material has a specific surface area within these ranges, a lithium battery including the composite cathode active material may have further improved cycle characteristics and thermal stability.

According to an embodiment, a composite cathode active material includes: a core including a first lithium transition metal oxide represented by Formula 1, the first lithium transition metal oxide having a layered crystal structure belonging to an $R\bar{3}m$ space group; and a shell on a surface of the core or at least adjacent to the surface of the core, the shell having a spinel crystal structure and including a dopant, wherein a sum of peak intensities defined as [(Dopant peak intensity+Co peak intensity)/(Mn peak intensity)] before and after $Ar^+$ sputtering in surface X-ray photoelectron (XPS) spectrum of the composite cathode active material is about 5 or greater.

In Formula 1, M may include Ni and at least one non-nickel Group 4 to Group 13 element, a Ni content in M may be about 70 mol % or greater, based on a total content of M, and 0.9≤a≤1.1. For example, in Formula 1, 0.95≤a≤1.05, 0.97≤a≤1.03, 0.99≤a≤1.01, 1≤a≤1.05, 1≤a≤1.04, or 1≤a≤1.03.

In an embodiment wherein the sum of the peak intensities defined as [(Dopant peak intensity+Co peak intensity)/(Mn peak intensity)] before and after $Ar^+$ sputtering in the surface XPS spectrum of the composite cathode active material is about 5 or greater, a lithium battery including the composite cathode active material may have further improved cycle characteristics and thermal stability. In the composite cathode active material, the shell having the spinel crystal structure and including a dopant may be the same as described in the above embodiments.

For example, the first lithium transition metal oxide of the composite cathode active material may be represented by Formula 3.

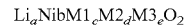

In Formula 3, M1, M2, and M3 may be different and may each independently include manganese (Mn), vanadium (V), chromium (Cr), iron (Fe), cobalt (Co), zirconium (Zr), rhenium (Re), aluminum (Al), boron (B), germanium (Ge), ruthenium (Ru), tin (Sn), titanium (Ti), niobium (Nb), molybdenum (Mo), or platinum (Pt), $0.9 \leq a \leq 1.1$, $0.7 < b < 1.0$, $0 < c < 0.3$, $0 < d < 0.4$, $0 \leq e < 0.3$, and $b+c+d+e=1$. For example, in Formula 3, $0.95 \leq a \leq 1.05$, $0.97 \leq a \leq 1.03$, $0.99 \leq a \leq 1.01$, $1 \leq a \leq 1.05$, $1 \leq a \leq 1.04$, or $1 \leq a \leq 1.03$.

In some embodiments, the first lithium transition metal oxide of the composite cathode active material may be represented by Formula 4.

$$Li_aNi_bCo_cMn_dM3'_eO_2 \qquad \text{Formula 4}$$

In Formula 4, $0.9 \leq a \leq 1.1$, $0.7 < b < 1.0$, $0 < c < 0.3$, $0 < d < 0.4$, $0 \leq e < 0.3$, $b+c+d+e=1$, and M3' may be an element selected from vanadium (V), chromium (Cr), iron (Fe), zirconium (Zr), rhenium (Re), aluminum (Al), boron (B), germanium (Ge), ruthenium (Ru), tin (Sn), titanium (Ti), niobium (Nb), molybdenum (Mo), and platinum (Pt). For example, in Formula 4, $0.95 \leq a \leq 1.05$, $0.97 \leq a \leq 1.03$, $0.99 \leq a \leq 1.01$, $1 \leq a \leq 1.05$, $1 \leq a \leq 1.04$, or $1 \leq a \leq 0.03$.

According to an embodiment, a cathode may include the composite cathode active material according to any of the above-described embodiments.

The cathode may be prepared as follows. A composite cathode active material according to any of the above-described embodiments, a conducting agent, a binder, and a solvent may be mixed together to prepare a cathode active material composition. The cathode active material composition may be directly coated on an aluminum current collector to prepare a cathode plate having a cathode active material film. In some embodiments, the cathode active material composition may be cast on a separate support to form a cathode active material film. This cathode active material film may then be separated from the support and laminated on an aluminum current collector to prepare a cathode plate (or a cathode) having the cathode active material film.

The conducting agent may be carbon black, graphite particulates, natural graphite, artificial graphite, acetylene black, or Ketjen black; carbon fibers; carbon nanotubes; a metal powder, metal fibers, or metal tubes of copper, nickel, aluminum, or silver; or a conducting polymer such as a polyphenylene derivative, but embodiments are not limited thereto. Any suitable material available as a conducting agent in the art may be used.

Examples of the binder are a vinylidene fluoride/hexafluoropropylene copolymer, polyvinylidene fluoride ("PVDF"), polyacrylonitrile, poly(methyl methacrylate), polytetrafluoroethylene ("PTFE"), mixtures thereof, and a styrene-butadiene rubber polymer, but embodiments are not limited thereto. Any suitable material available as a binding agent in the art may be used. Examples of the solvent are N-methyl-pyrrolidone (NMP), acetone, or water, but embodiments are not limited thereto. Any suitable material available as a solvent in the art may be used.

In some embodiments, pores may be formed in the cathode plate by further adding a plasticizing agent to the cathode active material composition.

The amounts of the composite cathode active material, the conducting agent, the binder, and the solvent may be the same as amounts generally used in the art for lithium secondary batteries. At least one of the conducting agent, the binder, and the solvent may be omitted according to the use and the structure of the lithium secondary battery.

The cathode may include a second cathode active material in addition to the composite cathode active material used above.

The second cathode active material may be any suitable material available as a cathode active material in the art and, for example, may be a lithium-containing metal oxide. For example, the second cathode active material may be a lithium composite oxide including Co, Mn, Ni, or a combination thereof. In some embodiments, the second cathode active material may be a compound represented by the following formulae: $Li_aA_{1-b}B'_bD_2$ (wherein $0.90 \leq a \leq 1$ and $0 \leq b \leq 0.5$); $Li_aE_{1-b}B'_bO_{2-c}D_c$ (wherein $0.90 \leq a \leq 1$, $0 \leq b \leq 0.5$, and $0 \leq c \leq 0.05$); $LiE_{2-b}B'_bO_{4-c}D_c$ (wherein $0 \leq b \leq 0.5$ and $0 \leq c \leq 0.05$); $Li_aNi_{1-b-c}Co_bB'_cD_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_\alpha$ (wherein $0.90 \leq a \leq 1$, $0 \leq b \leq 0.5$, $0 \leq c \leq 0.05$, and $0 \leq a \leq 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.5$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1$, $0 \leq b \leq 0.9$, $0 \leq c \leq 0.5$, $0 \leq d \leq 50.5$, and $0.001 \leq e \leq 0.1$); $Li_aNiG_bO_2$ (wherein $0.90 \leq a \leq 1$ and $0.001 \leq b \leq 0.1$); $Li_aCoG_bO_2$ (wherein $0.90 \leq a \leq 1$ and $0.001 \leq b \leq 0.1$); $Li_aMnG_bO_2$ (wherein $0.90 \leq a \leq 1$ and $0.001 \leq b \leq 0.1$); $Li_aMn_2G_bO_4$ (wherein $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A may include nickel (Ni), cobalt (Co), manganese (Mn), or a combination thereof; B' may include aluminum (Al), nickel (Ni), cobalt (Co), manganese (Mn), chromium (Cr), iron (Fe), magnesium (Mg), strontium (Sr), vanadium (V), a rare earth element, or a combination thereof; D may include oxygen (O), fluorine (F), sulfur (S), phosphorus (P), or a combination thereof; E may include cobalt (Co), manganese (Mn), or a combination thereof; F' may include fluorine (F), sulfur (S), phosphorus (P), or a combination thereof; G may include aluminum (Al), chromium (Cr), manganese (Mn), iron (Fe), magnesium (Mg), lanthanum (La), cerium (Ce), strontium (Sr), vanadium (V), or a combination thereof; Q may include titanium (Ti), molybdenum (Mo), manganese (Mn), or a combination thereof; I' may include chromium (Cr), vanadium (V), iron (Fe), scandium (Sc), yttrium (Y), or a combination thereof; and J may include vanadium (V), chromium (Cr), manganese (Mn), cobalt (Co), nickel (Ni), copper (Cu), or a combination thereof.

The compounds listed above as cathode active materials may have a surface coating layer (hereinafter, also referred to as "coating layer"). In an embodiment, a mixture of a compound without a coating layer and a compound having a coating layer, the compounds being those listed above, may be used. In some embodiments, the coating layer may include an oxide, a hydroxide, an oxyhydroxide, an oxycarbonate, a hydroxycarbonate, or a combination thereof. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In some embodiments, the coating layer may be formed using any suitable method that does not adversely affect the physical properties of the cathode active material when a compound of the coating element is used. For example, the coating layer may be formed using a spray coating method or a dipping method. The coating methods may be well understood by one of ordinary skill in the art, and thus a detailed description thereof will be omitted.

According to an embodiment, a lithium battery may include a cathode including the composite cathode active material according to any of the above-described embodiments. The lithium battery may be prepared in the following manner.

First, a cathode may be prepared according to the above-described method.

Next, an anode may be prepared as follows. The anode may be prepared in the same manner as applied to the cathode, except that an anode active material is used instead of the composite cathode active material. A conducting agent, a binder, and a solvent, which may be used to prepare an anode active material composition, may be the same as those used to prepare the cathode.

For example, an anode active material, a conducting agent, a binder, and a solvent may be mixed together to prepare the anode active material composition. The anode active material composition may be directly coated on a copper current collector to prepare an anode plate (or an anode). In some embodiments, the anode active material composition may be cast on a separate support to form an anode active material film. This anode active material film may then be separated from the support and laminated on a copper current collector to prepare an anode plate.

The anode active material may be any suitable material that is used in the art. Examples of the anode active material may include lithium, a metal alloyable with lithium, a transition metal oxide, a non-transition metal oxide, a carbonaceous material, and a combination thereof.

For example, the metal/metalloid alloyable with lithium may be Si, Sn, Al, Ge, Pb, Bi, Sb, an Si—Y' alloy (wherein Y' may be an alkali metal, an alkaline earth metal, a Group 13 to 16 element, a transition metal, a rare earth element, or a combination thereof, but is not Si), or an Sn—Y' alloy (wherein Y' may be an alkali metal, an alkaline earth metal, a Group 13 to 16 element, a transition metal, a rare earth element, or a combination thereof, but is not Sn). Examples of the element Y' may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

Examples of the transition metal oxide may include a lithium titanium oxide, a vanadium oxide, and a lithium vanadium oxide.

Examples of the non-transition metal oxide may include $SnO_2$ and $SiO_x$ (wherein $0<x<2$).

The carbonaceous material may be crystalline carbon, amorphous carbon, or a combination thereof. Examples of the crystalline carbon may include graphite, such as natural graphite or artificial graphite in non-shaped, plate, flake, spherical, or fibrous form. Examples of the amorphous carbon may include soft carbon (carbon calcined at a low temperature), hard carbon, meso-phase pitch carbonization products, and calcined coke.

The amounts of the anode active material, the conducting agent, the binder, and the solvent may be the same as amounts generally used in the art for lithium secondary batteries.

Next, a separator to be disposed between the cathode and the anode may be prepared. The separator for the lithium battery may be any suitable separator used in lithium batteries. In some embodiments, the separator may have low resistance to migration of ions in an electrolyte and have good electrolyte-retaining ability. Examples of the separator are glass fiber, polyester, Teflon™, polyethylene, polypropylene, PTFE, or a combination thereof, each of which may be a non-woven or woven fabric. For example, a rollable separator including polyethylene or polypropylene may be used for a lithium ion battery. A separator with a suitable organic electrolyte solution-retaining ability may be used for a lithium ion polymer battery. For example, the separator may be manufactured in the following manner.

In some embodiments, a polymer resin, a filler, and a solvent may be mixed together to prepare a separator composition. Then, the separator composition may be directly coated on an electrode, and then dried to form the separator. In some embodiments, the separator composition may be cast on a support and then dried to form a separator film. This separator film may then be separated from the support and laminated on an electrode to form the separator.

The polymer resin used to manufacture the separator may be any suitable material commonly used as a binder for electrode plates. Examples of the polymer resin are a vinylidenefluoride/hexafluoropropylene copolymer, PVDF, polyacrylonitrile, poly(methylmethacrylate), or a mixture thereof.

Then, an electrolyte is prepared.

In some embodiments, the electrolyte may be an organic electrolyte solution. In some embodiments, the electrolyte may be in a solid phase. Examples of the electrolyte are lithium oxide and lithium oxynitride. Any suitable material available as a solid electrolyte in the art may be used. In some embodiments, the solid electrolyte may be formed on the anode by, for example, sputtering.

In some embodiments, the organic electrolyte solution may be prepared by dissolving a lithium salt in an organic solvent.

The organic solvent may be any suitable solvent available as an organic solvent in the art. In some embodiments, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or a mixture thereof.

In some embodiments, the lithium salt may be any suitable material available as a lithium salt in the art. In some embodiments, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y may each independently be a natural number), LiCl, LiI, or a mixture thereof.

Figure 11:
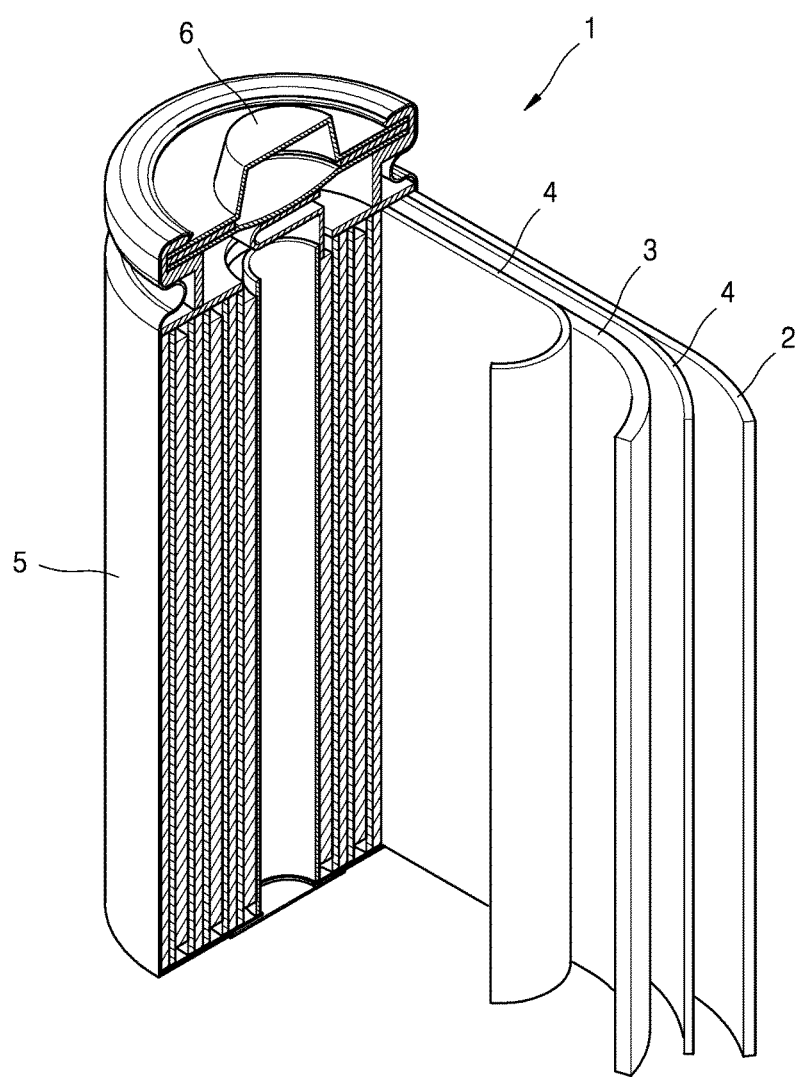
FIG. 11 is a schematic view of an exemplary embodiment of a lithium battery.

Referring to FIG. 11, a lithium battery 1 according to an embodiment may include a cathode 3, an anode 2, and a separator 4. In some embodiments, the cathode 3, the anode 2, and the separator 4 may be wound or folded, and then sealed in a battery case 5. In some embodiments, the battery case 5 may be filled with an organic electrolyte solution and sealed with a cap assembly 6, thereby completing the manufacture of the lithium battery 1. In some embodiments, the battery case 5 may have a cylindrical, rectangular, or thin-film shape. For example, the lithium battery 1 may be a large-sized thin-film-type battery. In some embodiments, the lithium battery 1 may be a lithium ion battery.

In some embodiments, the separator 4 may be disposed between the cathode 3 and the anode 2 to form a battery assembly. In some embodiments, the battery assembly may be stacked in a bi-cell structure and impregnated with the electrolyte solution. In some embodiments, the resultant assembly may be put into a pouch and hermetically sealed, thereby completing the manufacture of a lithium ion polymer battery.

In some embodiments, a plurality of battery assemblies may be stacked to form a battery pack, which may be used in any device that requires high capacity and high output, for example, in a laptop computer, a smartphone, or an electric vehicle.

The lithium battery 1 may have improved lifetime characteristics and high-rate characteristics, and thus may be used in an electric vehicle ("EV"), for example, in a hybrid vehicle such as a plug-in hybrid electric vehicle ("PHEV"). The lithium battery may be applicable to the high-power storage field. For example, the lithium battery may be used in an electric bicycle or a power tool.

As the lithium battery is charged to a high voltage of about 4.5 volts (V) with respect to lithium during initial charging, the spinel crystal structure of the shell (coating layer) belonging to an Fd$\overline{3}$m space group may be activated, generating extra charge capacity and discharge capacity. Thus, the lithium battery may have improved initial charge-discharge efficiency.

According to an embodiment, a method of preparing a composite cathode active material according to any of the above-described embodiments includes mixing a first lithium transition metal oxide represented by Formula 1 and a metal-organic framework ("MOF") to prepare a mixture, the first lithium transition metal oxide having a layered crystal structure belonging to an R$\overline{3}$m space group; and thermally treating the mixture under oxidizing atmosphere at about 650° C. to about 800° C. for about 3 hours to about 20 hours.

$$Li_aMO_2 \qquad \qquad \text{Formula 1}$$

In Formula 1, M includes Ni and at least one non-nickel Group 4 to Group 13 element, a content of Ni is about 70 mol % or greater, based on a total content of M, and 0.9≤a≤1.1. For example, in Formula 1, 0.95≤a≤1.05, 0.97≤a≤1.03, 0.99≤a≤1.01, 1≤a≤1.05, 1≤a≤1.04, or 1≤a≤1.03.

In the method of preparing the composite cathode active material, after the first lithium transition metal oxide is mixed with the MOF, the mixture may be thermally treated under an oxidizing atmosphere as described above to form the shell as a coating layer on a surface of the first lithium transition metal oxide or in a region near the surface, the shell having the spinel crystal structure and including a dopant. The coating layer may be present in a continuous or discontinuous form on the surface of the core particle. The shell may fully or partially coat the core particle.

The thermal treatment temperature may be, for example, about 650° C. to about 800° C., about 650° C. to about 750° C., or about 700° C. to about 750° C. The oxidizing atmosphere may include an oxidizing gas, for example, oxygen or air. The thermal treatment time may be about 3 hours to about 20 hours, about 3 hours to about 15 hours, about 3 hours to about 10 hours, about 3 hours to about 7 hours, or about 4 hours to about 6 hours. However, the thermal treatment conditions are not limited to these ranges or compositions, and may be appropriately chosen or varied within ranges allowing the composite cathode active material to form such a shell having the spinel crystal structure.

The MOF may include Co, Zn, Fe, Cu, Ni, Mn, Zr, Ti, Mg, or a combination thereof. The metal of the MOF may be doped on the surface of the core of the first lithium transition metal oxide or react with residual surface lithium of the first lithium transition metal oxide, thus forming the shell. An organic component of the MOF may be easily removed by decomposition and evaporation at a low temperature. Accordingly, the metal of the MOF may have relatively high purity and react with the core of the first lithium transition metal oxide at a heat treatment temperature of about 650° C. The relatively high-purity metal of the MOF is distinguished from other metal sources, for example, a metal salt such as a metal halide. For example, $CoCl_2$ has a melting point of about 735° C., similar to the heat treatment temperature.

The MOF may include a polyhedral primary particle. The primary particle of the MOF may have a polyhedral structure, for example, a hexahedral, heptahedral, or octahedral structure. The polyhedral primary particle may have a particle diameter of about 2 nm to about 300 nm, about 5 nm to about 300 nm, about 10 nm to about 300 nm, about 50 nm to about 300 nm, about 50 nm to about 250 nm, about 50 nm to about 200 nm, or about 100 nm to about 200 nm.

The MOF may be Co-embedded N-doped carbon (Co—NC, for example, ZIF-67), or Zn-embedded N-doped carbon (Zn—NC, for example, ZIF-8). However, embodiments are not limited thereto. Any suitable material available as an MOF in the art may be used.

The amount of the MOF in the mixture obtained by mixing the first lithium transition metal oxide and the MOF, may be about 6 parts by weight or less, about 5 parts by weight or less, about 4 parts by weight or less, or about 3 parts by weight or less, and in some embodiments, may be about 0.1 parts by weight or greater, or about 0.5 parts by weight or greater, based on 100 parts by weight of the first lithium transition metal oxide.

An embodiment will now be described in further detail with reference to the following examples. However, these examples are only for illustrative purposes and shall not limit the scope of the disclosed embodiment.

EXAMPLES

Preparation of Metal-Organic Framework (MOF)

Preparation Example 1: Co—NC 1,000 milliliters (mL) of a methanol solution including 600 milliMolar (mM) of 2-methylimidazole was stirred at about 500 rpm for about 5 minutes. 80 mM of Co(NO$_3$)$_2$.6H$_2$O was added to the methanol solution and stirred at about 500 rpm for about 12 hours to prepare Co-embedded N-doped carbon (Co—NC, ZIF-67) nanocrystals. The Co—NC nanocrystals were spun down at about 5,000 rpm for about 10 minutes. The resulting Co—NC precipitate was filtered and dried to obtain Co—NC powder. This Co—NC powder included primary particles having an average particle diameter of about 100 nm to about 200 nm.

Preparation Example 2: Zn—NC 1,000 mL of a methanol solution including 300 mM of 2-methylimidazole was stirred at about 500 rpm for about 5 minutes. 90 mM of Zn(NO$_3$)$_2$.6H$_2$O was added to the methanol solution and stirred at about 500 rpm for about 12 hours to prepare Zn-embedded N-doped carbon (Zn—NC, ZIF-8) nanocrystals. The Zn—NC nanocrystals were spun down at about 5,000 rpm for about 10 minutes. The resulting Zn—NC precipitate was filtered and dried to obtain Zn—NC powder.

Preparation of Composite Cathode Active Material

Example 1: Ni91+Co—NC 1 wt % by Drying Process $LiNi_{0.91}Co_{0.04}Mn_{0.05}O_2$ was added into distilled water, followed by filtration, drying at about 120° C. (i.e., washing process).

100 parts by weight of the washed $LiNi_{0.91}Co_{0.04}Mn_{0.05}O_2$ as a first lithium transition metal oxide and 1 part by weight of the Co—NC powder as the MOF prepared in Preparation Example 1 were mixed to prepare a mixture.

This mixture was put into a furnace and then thermally treated at about 720° C. for about 5 hours while oxygen was flowed into the furnace.

During the thermal treatment process, a coating layer having a Co-doped spinel crystal structure was formed on the $LiNi_{0.91}Co_{0.04}Mn_{0.05}O_2$ core by reaction of residual surface lithium such as $Li_2CO_3$ and LiOH on the core surface with the Co—NC.

During the thermal treatment process, the organic component of the Co—NC was easily removed by evaporation.

Example 2: Ni91+Co—NC 2 wt % by Drying Process

A composite cathode active material was prepared in the same manner as in Example 1, except that 100 parts by weight of the washed $LiNi_{0.91}Co_{0.04}Mn_{0.05}O_2$ as a first lithium transition metal oxide and 2 parts by weight of the Co—NC powder prepared as the MOF in Preparation Example 1 were mixed to prepare a mixture.

Example 3: Ni91+Co—NC 3 wt % by Drying Process

A composite cathode active material was prepared in the same manner as in Example 1, except that 100 parts by weight of the washed $LiNi_{0.91}Co_{0.04}Mn_{0.05}O_2$ as a first lithium transition metal oxide and 3 parts by weight of the Co—NC powder prepared as the MOF in Preparation Example 1 were mixed to prepare a mixture.

Example 4: Ni91+Co—NC 6 wt % by Drying Process

A composite cathode active material was prepared in the same manner as in Example 1, except that 100 parts by weight of the washed $LiNi_{0.91}Co_{0.04}Mn_{0.05}O_2$ as a first lithium transition metal oxide and 6 parts by weight of the Co—NC powder prepared as the MOF in Preparation Example 1 were mixed to prepare a mixture.

Example 5: Ni91+Zn—NC 1 wt % by Drying Process

A composite cathode active material was prepared in the same manner as in Example 1, except that 100 parts by weight of the washed $LiNi_{0.91}Co_{0.04}Mn_{0.05}O_2$ as a first lithium transition metal oxide and 1 part by weight of the Zn—NC powder prepared as the MOF in Preparation Example 2 were mixed to prepare a mixture.

Example 6: Ni91+(Co—NC+Zn—NC) 1 wt % by Drying Process

A composite cathode active material was prepared in the same manner as in Example 1, except that 100 parts by weight of the washed $LiNi_{0.91}Co_{0.04}Mn_{0.05}O_2$ as a first lithium transition metal oxide, 0.5 parts by weight of the Co—NC powder prepared as the MOF in Preparation Example 1, and 0.5 parts by weight of the Zn—NC powder prepared as the MOF in Preparation Example 2 were mixed to prepare a mixture.

During the thermal treatment process, a coating layer having a Co- and Zn-doped spinel crystal structure was formed on the $LiNi_{0.91}Co_{0.04}Mn_{0.05}O_2$ core by reaction of residual surface lithium such as $Li_2CO_3$ and LiOH on the surface of the core with the Co—NC and Zn—NC.

Example 7: Ni80+Co—NC 1 wt % by Drying Process 100 parts by weight of unwashed $LiNi_{0.80}Co_{0.15}Mn_{0.05}O_2$ as a first lithium transition metal oxide and 1 part by weight of the Co—NC powder as the MOF prepared in Preparation Example 1 were mixed to prepare a mixture.

This mixture was put into a furnace and then thermally treated at about 720° C. for about 5 hours while oxygen was flowed into the furnace.

During the thermal treatment process, a coating layer having a Co-doped spinel crystal structure was formed on the $LiNi_{0.80}Co_{0.15}Mn_{0.05}O_2$ core by reaction of residual surface lithium such as $Li_2CO_3$ and LiOH on the surface of the core with the Co—NC.

Comparative Example 1: Ni91 Alone (Bare—without Washing)

Unwashed $LiNi_{0.91}Co_{0.04}Mn_{0.05}O_2$ as a first lithium transition metal oxide was itself used as a composite cathode active material.

Comparative Example 2: Ni91 Alone (Washing)

$LiNi_{0.91}Co_{0.04}Mn_{0.05}O_2$ as a first lithium transition metal oxide, washed in the same manner as in Example 1, was itself used as a composite cathode active material.

Comparative Example 3: Ni91+$CoCl_2$ 0.75 wt % by Drying Process 100 parts by weight of unwashed $LiNi_{0.91}Co_{0.04}Mn_{0.05}O_2$ as a first lithium transition metal oxide and 0.75 parts by weight of $CoCl_2$ were added into distilled water, followed by filtration and drying at about 120° C. to obtain a dried product. This dried product was put into a furnace and then thermally treated at about 750° C. for about 10 hours while oxygen was flowed into the furnace, thereby preparing a composite cathode active material including a Co-doped coating layer on the $LiNi_{0.91}Co_{0.04}Mn_{0.05}O_2$ core.

Manufacture of Lithium Battery (Half Cell)

Example 8

Manufacture of Cathode

The composite cathode active material prepared in Example 1, a carbon conducting material (Denka Black), and polyvinylidene fluoride (PVdF) were mixed at a weight ratio of 92:4:4 to prepare a mixture, and the mixture was mixed with N-methylpyrrolidone (NMP) in an agate mortar to prepare a slurry. The slurry was bar-coated on an aluminum current collector having a thickness of 15 μm, dried at room temperature, dried once more in a vacuum at 120° C., and then roll-pressed and punched to manufacture a cathode plate having a thickness of 55 μm.

Manufacture of Coin Cell

A coin cell was manufactured using the cathode plate manufactured above, lithium metal as a counter electrode, a PTFE separator, and a solution prepared as an electrolyte by dissolving 1.25 Molar (M) of $LiPF_6$ in a mixture of ethylene carbonate ("EC"), ethylmethyl carbonate ("EMC"), and dimethyl carbonate ("DMC") at a volume ratio of 3:4:3.

Examples 9 to 14

Coin cells were manufactured in the same manner as in Example 8, except that the composite cathode active materials prepared in Examples 2 to 7 were used, respectively, instead of the composite cathode active material prepared in Example 1.

Comparative Examples 4 to 6

Coin cells were manufactured in the same manner as in Example 8, except that the composite cathode active materials prepared in Comparative Examples 1 to 3 were used, respectively, instead of the composite cathode active material prepared in Example 1.

Evaluation Example 1: Surface Composition Evaluation

Surfaces of the composite cathode active materials prepared in Comparative Example 1 and Examples 1 to 4 were analyzed by inductively coupled plasma spectroscopy ("ICP") and X-ray photoelectron spectroscopy ("XPS"). The results are shown in Tables 1 and 2.

TABLE 1

| Example | Molar ratio (Ni + Co + Mn = 1 mol) | | | |
|---|---|---|---|---|
| | Li | Mn | Co | Ni |
| Comparative Example 1 | 1.03 | 0.050 | 0.149 | 0.802 |
| Example 1 | 1.01 | 0.048 | 0.150 | 0.802 |
| Example 2 | 1.08 | 0.050 | 0.157 | 0.793 |
| Example 3 | 1.07 | 0.049 | 0.160 | 0.791 |
| Example 4 | 1.09 | 0.048 | 0.167 | 0.784 |

TABLE 2

| Example | Sum of intensity ratios of Co peak to Mn peak before and after $Ar^+$ sputtering |
|---|---|
| Comparative Example 1 | 4.7 |
| Example 1 | 5.6 |
| Example 2 | 6.5 |
| Example 3 | 6.5 |
| Example 4 | 9.9 |

Referring to Table 1, with the increasing Co—NC coating amounts in Examples 1 to 4, the Co—NC coated composite cathode active materials of Examples 1 to 4 had increased amounts of doped Co on the surfaces thereof, compared to the composite cathode active material of Comparative Example 1 including no coated Co—NC.

Table 2 is a table of a sum of an intensity ratio of a Co peak to a Mn peak ([Co peak intensity/Mn peak intensity]) in an XPS spectrum of each of the composite cathode active materials of Comparative Example 1 and Examples 1 to 4 before the surface of each of the composite cathode active materials was etched by $Ar^+$ ion sputtering, and an intensity ratio of a Co peak to a Mn peak in an internal XPS spectrum of each of the corresponding composite cathode active materials after the surface of each of the composite cathode active materials was etched by $Ar^+$ ion sputtering. The $Ar^+$ ion sputtering was performed onto an area of 1 millimeter squared ($mm^2$) at a voltage of about 1 kV for about 2 minutes.

Referring to Table 2, in the composite cathode active materials of Examples 1 to 4, the sum of the intensity ratios of a Co peak to a Mn peak before and after etching of the surface of each composite cathode active material was 5 or greater, indicating an increased Co content, originating from the Co—NC, on the surface of each composite cathode active material, compared to the composite cathode active material of Comparative Example 1. It was found that a Co-doped coating layer is formed on the surface of core, i.e., the composite cathode active material of Comparative Example 1, in Examples 1 to 4.

Evaluation Example 2: Surface Crystal Structure Evaluation

As shown in FIG. 1A, which is a scanning electron microscope ("SEM") image of the composite cathode active material prepared in Example 4, the composite cathode active material of Example 4 included secondary particles resulting from aggregation of a plurality of primary particles.

As shown in FIG. 1B, which is a transmission electron microscope ("TEM") image of the composite cathode active material of Example 4, a primary particle of a secondary particle had a polyhedral structure having a rectangular cross-sectional shape and included a through-hole as a polyhedral pore having a rectangular cross-sectional shape. In FIG. 1B, the through-hole appears as a bright region inside a polygonal dark (black) primary particle.

Figure 1C:
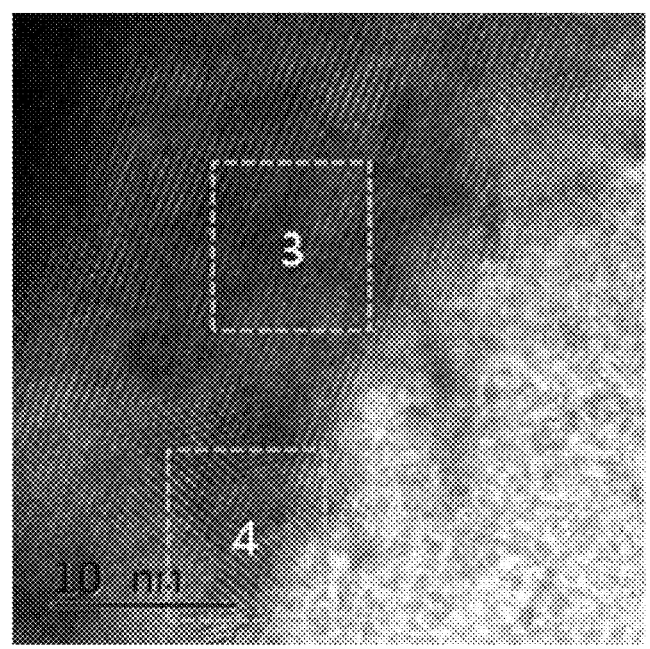
FIG. 1C is a magnified view of a boxed region of FIG. 1B.
Figure 1D:
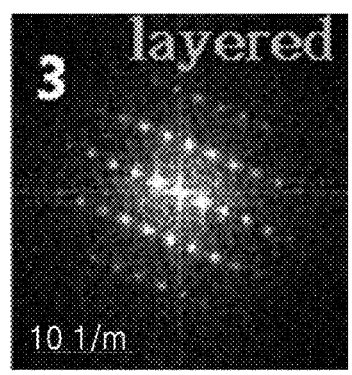
FIGS. 1D and 1E are diffraction patterns of boxed regions 3 and 4 of FIG. 1C, respectively.
Figure 1E:
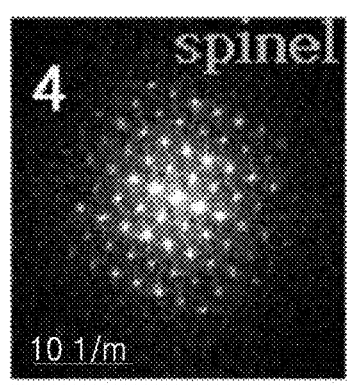

Referring to FIG. 1C, which is a magnified view of a portion of FIG. 1B, in the primary particle of the composite cathode active material prepared in Example 4, an inner region 3 thereof was found to have a layered crystal structure and a surface region 4 thereof was found to have a spinel crystal structure. In FIGS. 1D and 1E, which are magnified views of the inner and surface regions of the primary particle, respectively, the layered crystal structure and the spinel crystal structure are shown, respectively. On the surface of the core of the composite cathode active material of Example 4 having the layered crystal structure, a coating layer having the Co-doped spinel crystal structure was formed. The coating layer had a thickness of about 10 nm. It was also found that the spinel crystal structure belongs to an $Fd\bar{3}m$ space group.

Figure 2A:
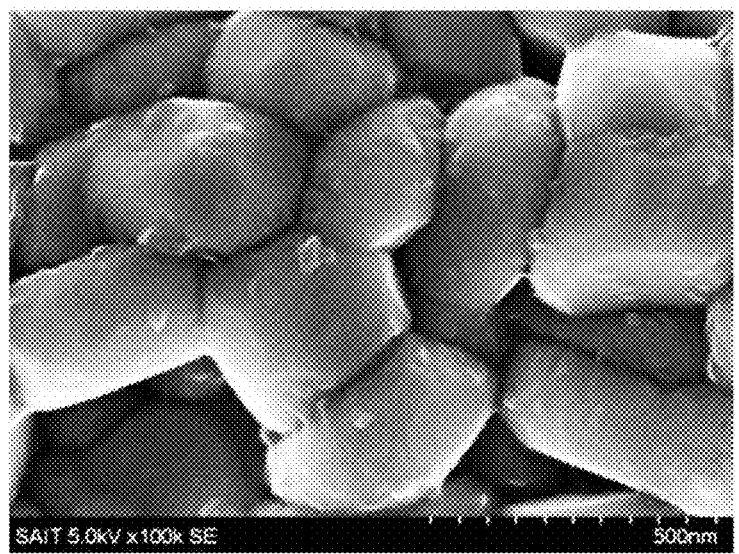
FIG. 2A is an SEM image of a surface of a composite cathode active material prepared in Comparative Example 1.

As shown in FIG. 2A, which is an SEM image of the composite cathode active material prepared in Comparative Example 1, the composite cathode active material of Comparative Example 1 included secondary particles resulting from aggregation of a plurality of primary particles.

Figure 2B:
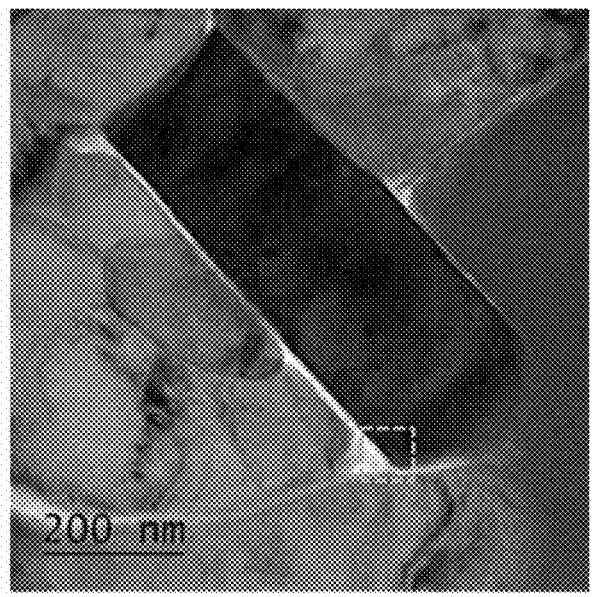
FIG. 2B is a TEM image of the surface of the composite cathode active material prepared in Comparative Example 1.

As shown in FIG. 2B, which is a TEM image of the composite cathode active material of Comparative Example 1, a primary particle of a secondary particle had a polyhedral structure having a rectangular cross-sectional shape, without a through-hole.

Figure 2C:
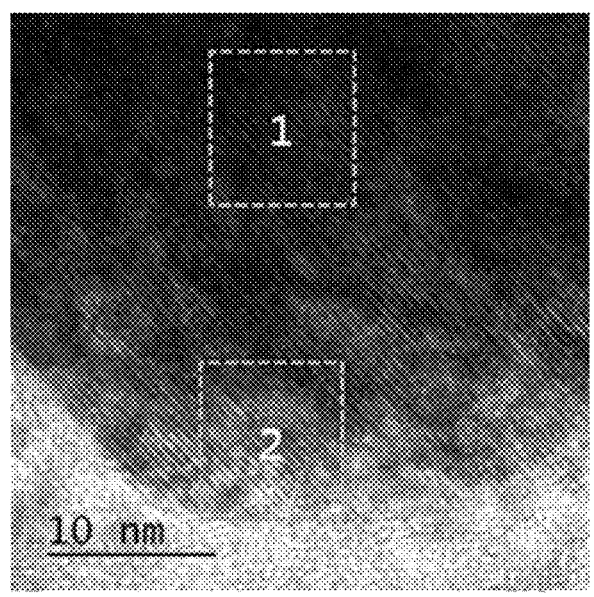
FIG. 2C is a magnified view of a boxed region of FIG. 2B.
Figure 2D:
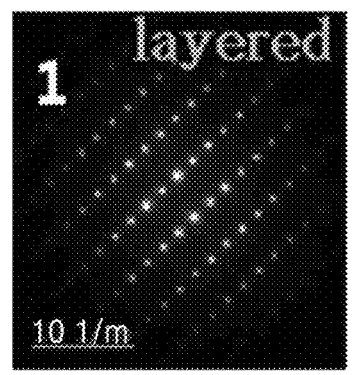
FIGS. 2D and 2E are diffraction patterns of boxed regions 1 and 2 of FIG. 2C, respectively.
Figure 2E:
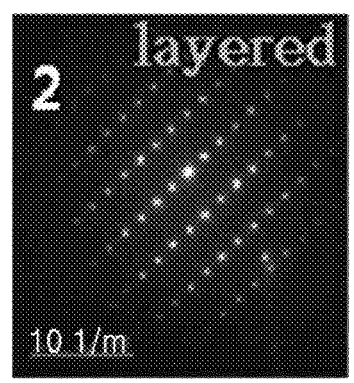

Referring to FIG. 2C, which is a magnified view of a portion of FIG. 2B, the primary particle of the composite cathode active material prepared in Comparative Example 1 was found to have a layered crystal structure in both an inner region 1 and a surface region 2 thereof. In FIGS. 2D and 2E, which are magnified views of the inner and surface regions, respectively, of the primary particle, the layered crystal structures are shown. That is, on the surface of the core of the composite cathode active material of Comparative Example 1 having the layered crystal structure, a coating layer having a spinel crystal structure was not formed.

Evaluation Example 3: Surface Composition Evaluation

Figure 3A:
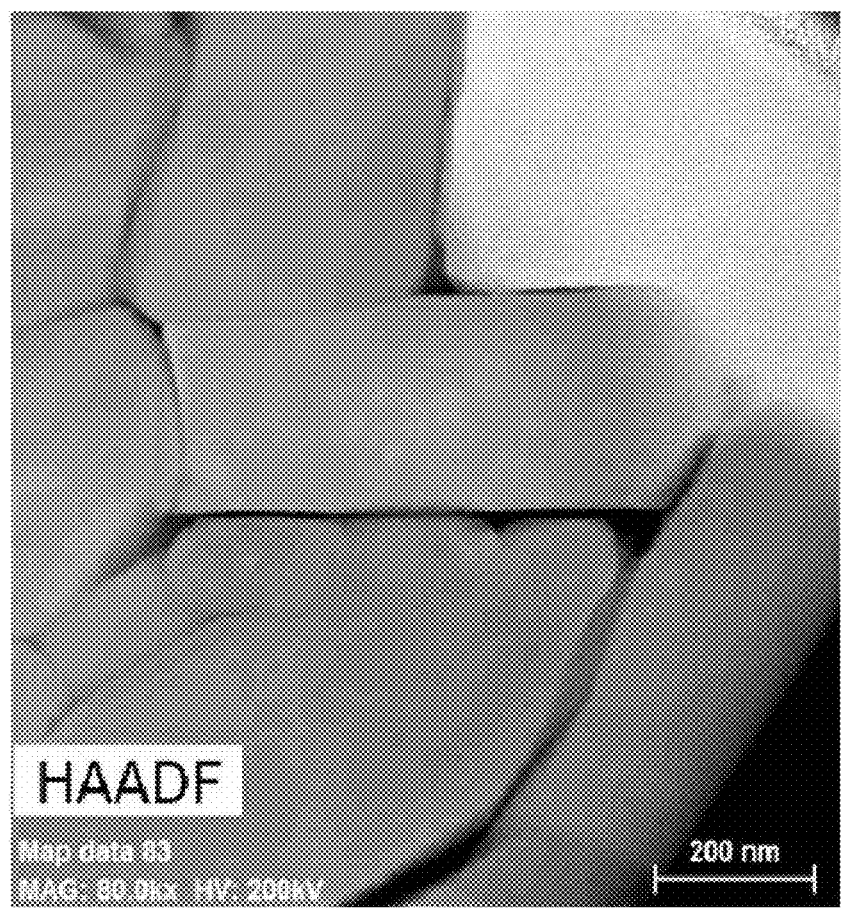
FIGS. 3A to 3C are high-angle annular dark-field ("HAADF") TEM images of a surface of the composite cathode active material prepared in Comparative Example 1.
Figure 3B:
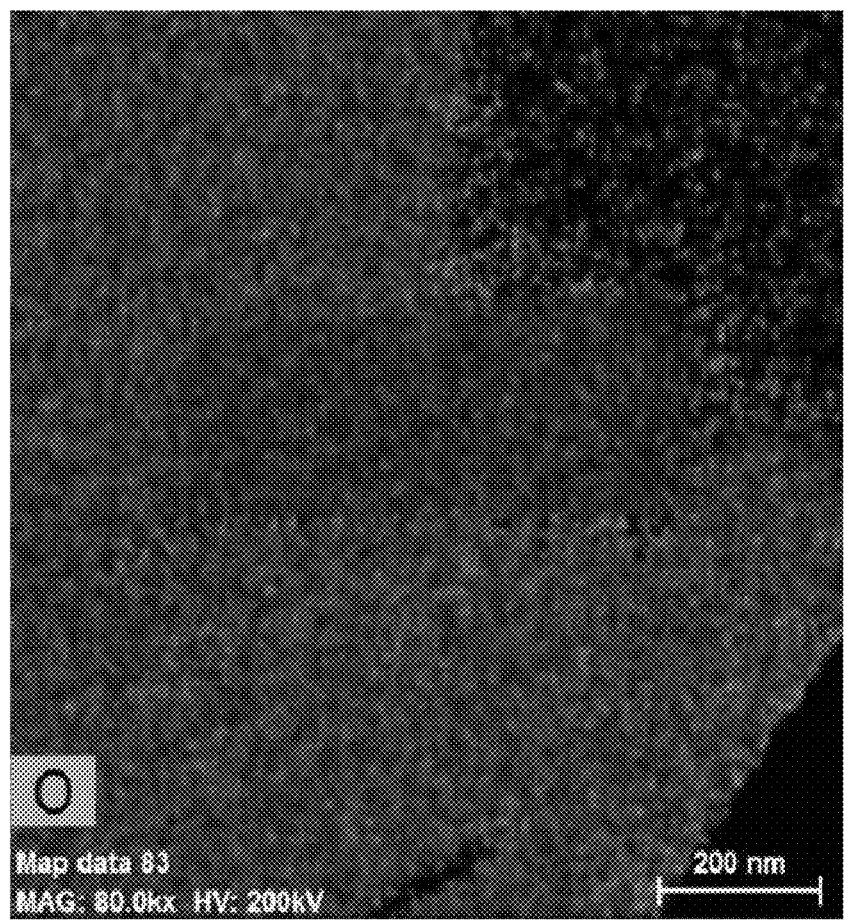
Figure 3C:
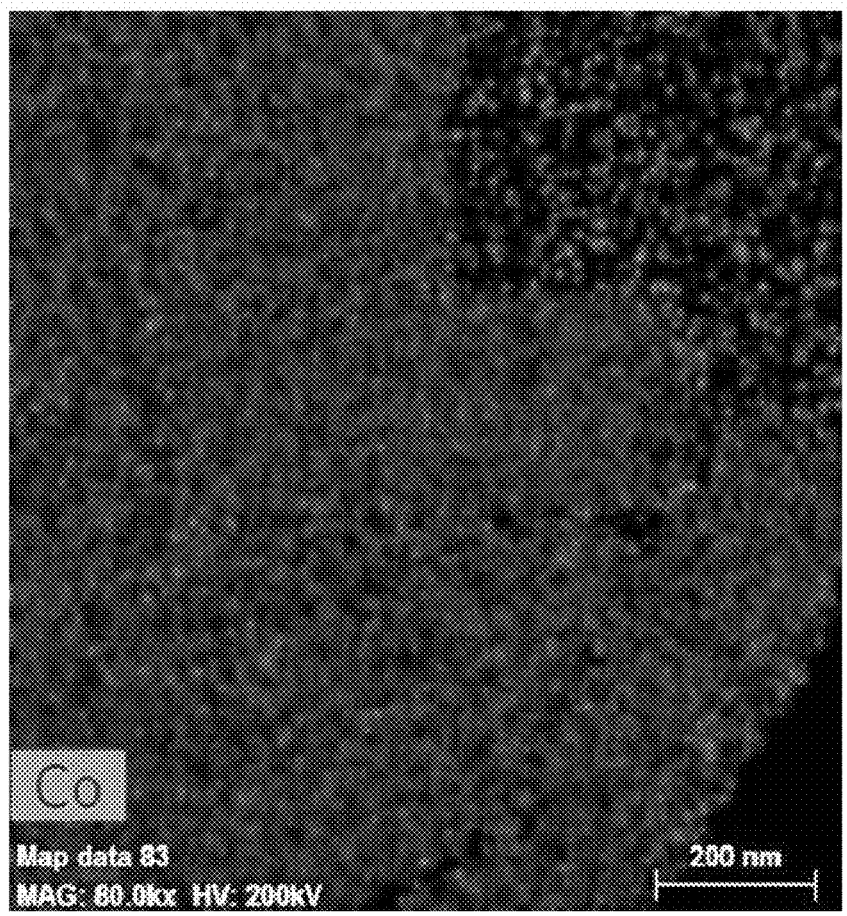

FIGS. 3A to 3C are high-angle annular dark-field ("HAADF") TEM images of the composite cathode active material of Comparative Example 1 including aggregates of a plurality of primary particles.

Figure 4C:
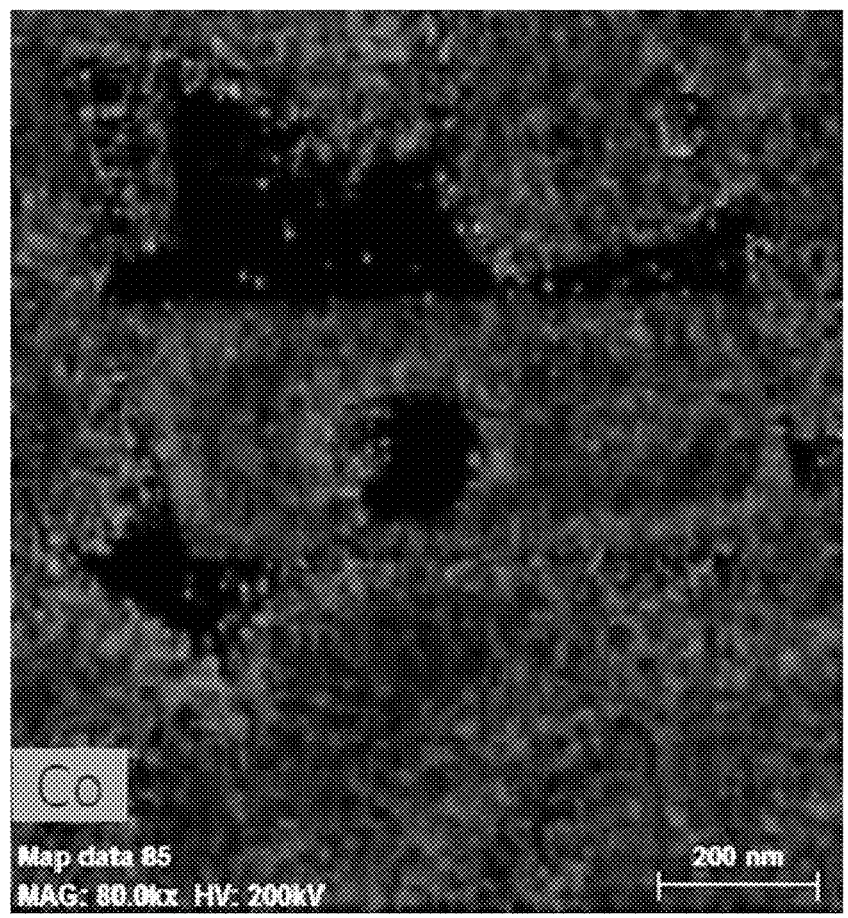

FIGS. 4A to 4C are HAADF TEM images of the composite cathode active material of Example 4 including aggregates of a plurality of primary particles.

As shown in FIG. 4A, the composite cathode active material of Example 4 included more pores, including pores in the form of through-holes, in the primary particles, compared to the composite cathode active material of Comparative Example 1 shown in FIG. 3A.

Compared to the composite cathode active material of Comparative Example 1 as shown in FIG. 3B, the composite cathode active material of Example 4 was found to include more pores in the primary particles with surfaces uniformly doped with oxygen, as shown in an oxygen-mapping image of FIG. 4B.

Compared to the composite cathode active material of Comparative Example 1 shown in FIG. 3C, the composite cathode active material of Example 4 was found to include more pores in the primary particles with surfaces uniformly doped with cobalt (Co), as shown in a Co-mapping image of FIG. 4C.

Therefore, the composite cathode active material of Example 4 was found to have a Co-doped coating layer as a shell on its surface.

Evaluation Example 4: Specific Surface Area and Mesopore Size Evaluation

Figure 5:
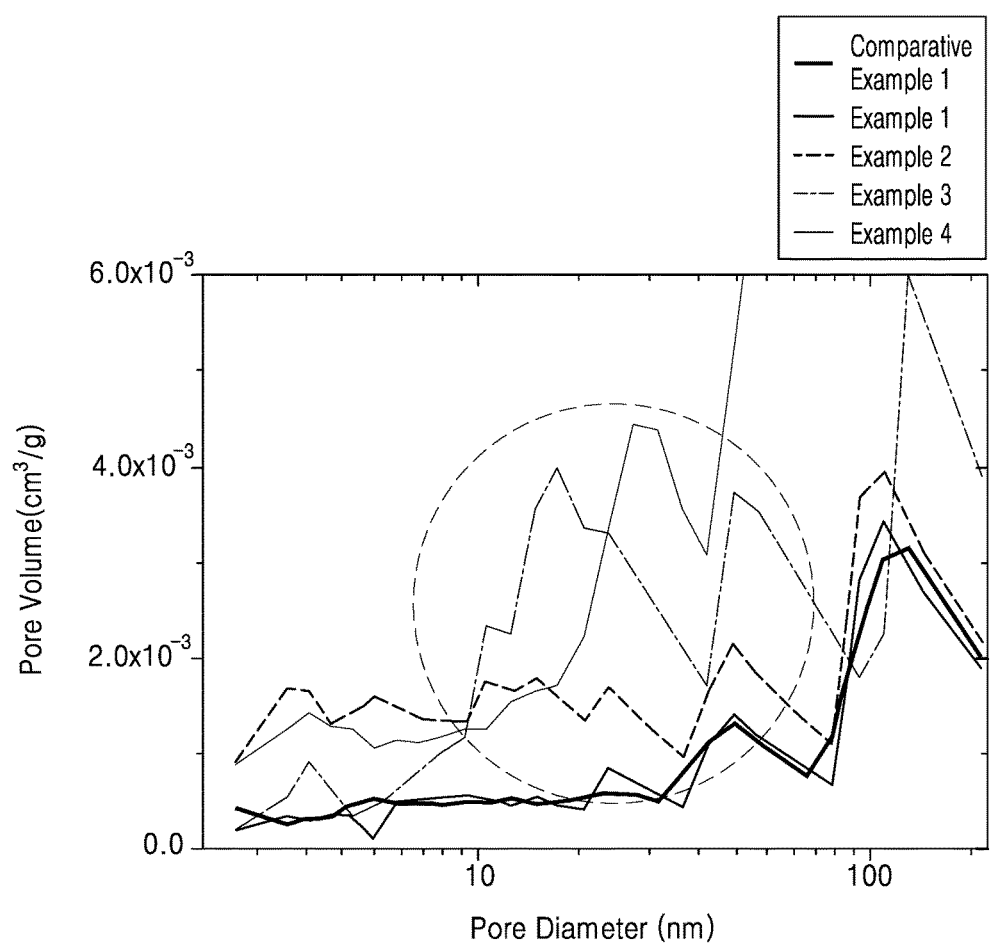
FIG. 5 is a graph of pore volume (cubic centimeters per gram, cm³/g) versus pore diameter (nanometers, nm) of the composite cathode active materials of Examples 1 to 4 and Comparative Example 1.

Brunauer-Emmett-Teller ("BET") specific surface areas of the composite cathode active materials prepared in Comparative Example 1 and Examples 1 to 4 were analyzed by a nitrogen adsorption method. The results are shown in Table 3. A distribution of pore volume with respect to pore size in each of the composite cathode active materials is shown in FIG. 5.

TABLE 3

| Example | Specific surface area (m$^2$/g) |
| --- | --- |
| Comparative Example 1 | 0.47954 |
| Example 1 | 0.48603 |
| Example 2 | 0.52289 |
| Example 3 | 0.67593 |
| Example 4 | 1.4141 |

As shown in Table 3, the composite cathode active materials of Examples 1 to 4 had an increased specific surface area, which was further increased with increased amounts of coated Co—NC, as compared to the composite cathode active material of Comparative Example 1.

As shown in FIG. 5, the composite cathode active materials of Examples 2 to 4 were found to have larger mesopores having a pore diameter of about 10 nm to about 100 nm and a pore volume of about 0.001 cm$^3$/g to about 0.005 cm$^3$/g.

Evaluation Example 5: X-Ray Diffraction ("XRD") Analysis

Figure 6:
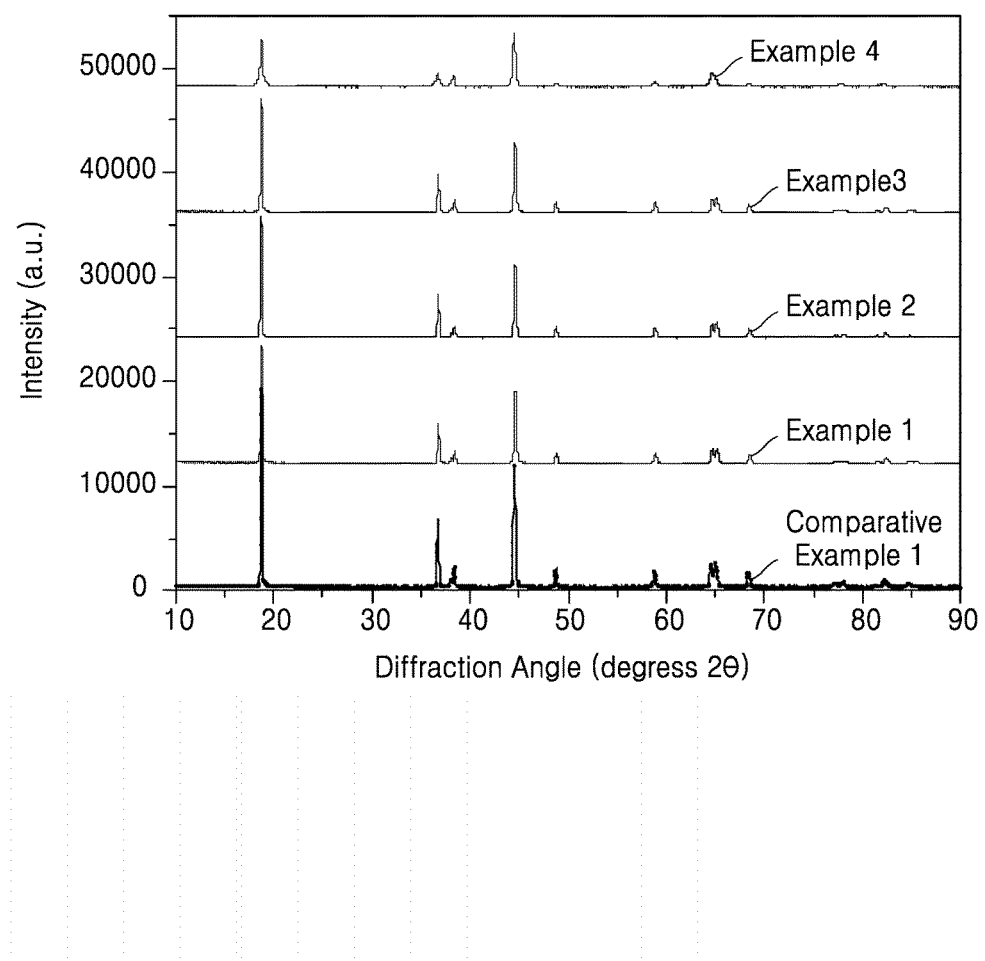
FIG. 6 is a graph of intensity (arbitrary units, a.u.) versus diffraction angle (degrees 2-theta, 2θ) showing the results of X-ray diffraction ("XRD") analysis of the composite cathode active materials of Examples 1 to 4 and Comparative Example 1.

As shown in FIG. 6, in the XRD spectra of the composite cathode active materials of Examples 1 to 4, a peak intensity ratio I(003)/I(104) of the intensity of a peak of the (003) crystal plane to the intensity of a peak of the (104) crystal plane was smaller than a peak intensity ratio I(003)/I(104) in the XRD spectrum of the composite cathode active material of Comparative Example 1. That is, due to the inclusion of a pyrolysis product of the MOF coated on the composite cathode active material of Comparative Example 1 having a layered crystal structure, the composite cathode active materials of Examples 1 to 4 had a reduced peak intensity ratio I(003)/I(104) of the peak of the (003) crystal plane to the peak of the (104) crystal plane.

Such a reduced peak intensity ratio I(003)/I(104) of the peak of the (003) crystal plane at about 19° to the peak of the (104) crystal plane at about 44° in the XRD spectrum of the lithium transition metal oxide having a layered crystal structure may indicate a reduced size of crystals having the layered crystal structure, a reduced amount of the layered crystal structure, and formation of a spinel crystal structure.

Evaluation Example 6: Raman Analysis

Figure 7:
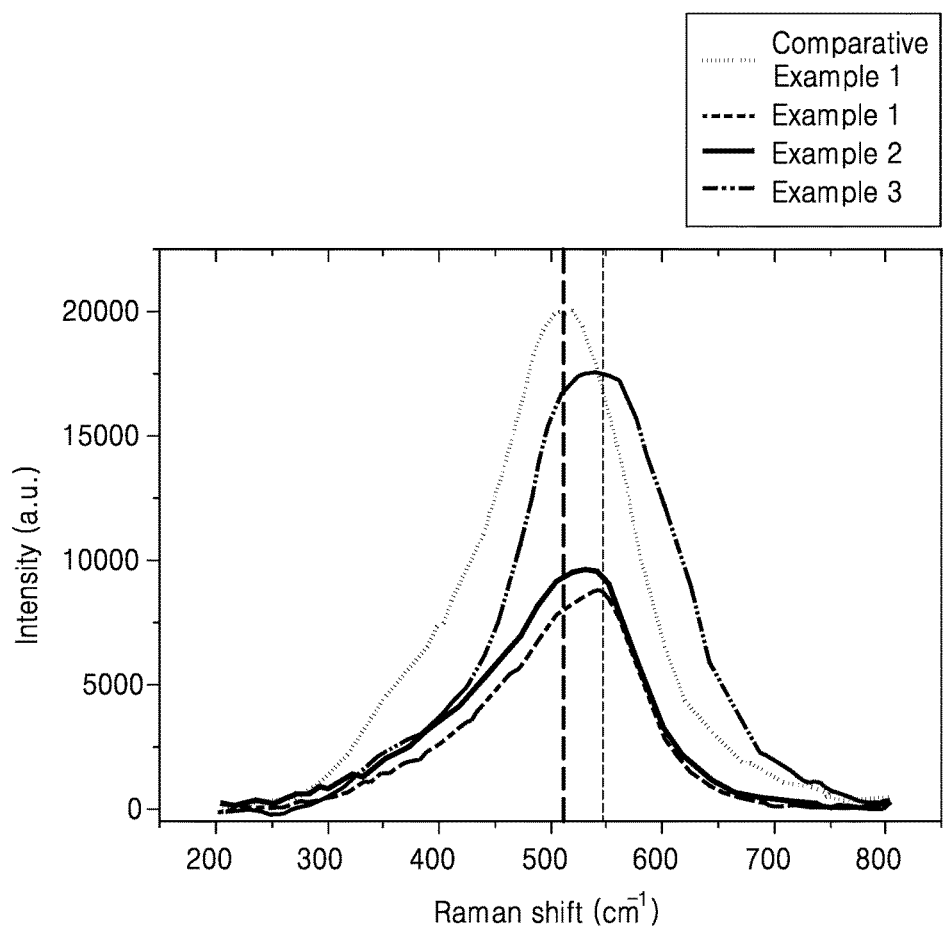
FIG. 7 is a graph of intensity (arbitrary units, a.u.) versus Raman Shift (inverse centimeters, cm⁻¹) showing the results of Raman analysis of the composite cathode active materials of Examples 1, 3 and 4 and Comparative Example 1.

Referring to FIG. 7, a maximum peak value near 510 cm$^{-1}$ in the Raman spectrum of the composite cathode active material of Comparative Example 1 was shifted to near 530 cm$^{-1}$ or greater in the Raman spectra of the composite cathode active materials of Examples 1, 2, and 3. This maximum peak value shift indicates that a coating layer having a spinel phase was formed on the core of the composite cathode active material.

Evaluation Example 7: Residual Surface Lithium Content Evaluation by XPS

Residual Surface lithium contents of the composite cathode active materials of Comparative Example 1 and Examples 1 to 4 were analyzed by XPS. The results are shown in FIG. 8 and Table 4.

Figure 8:
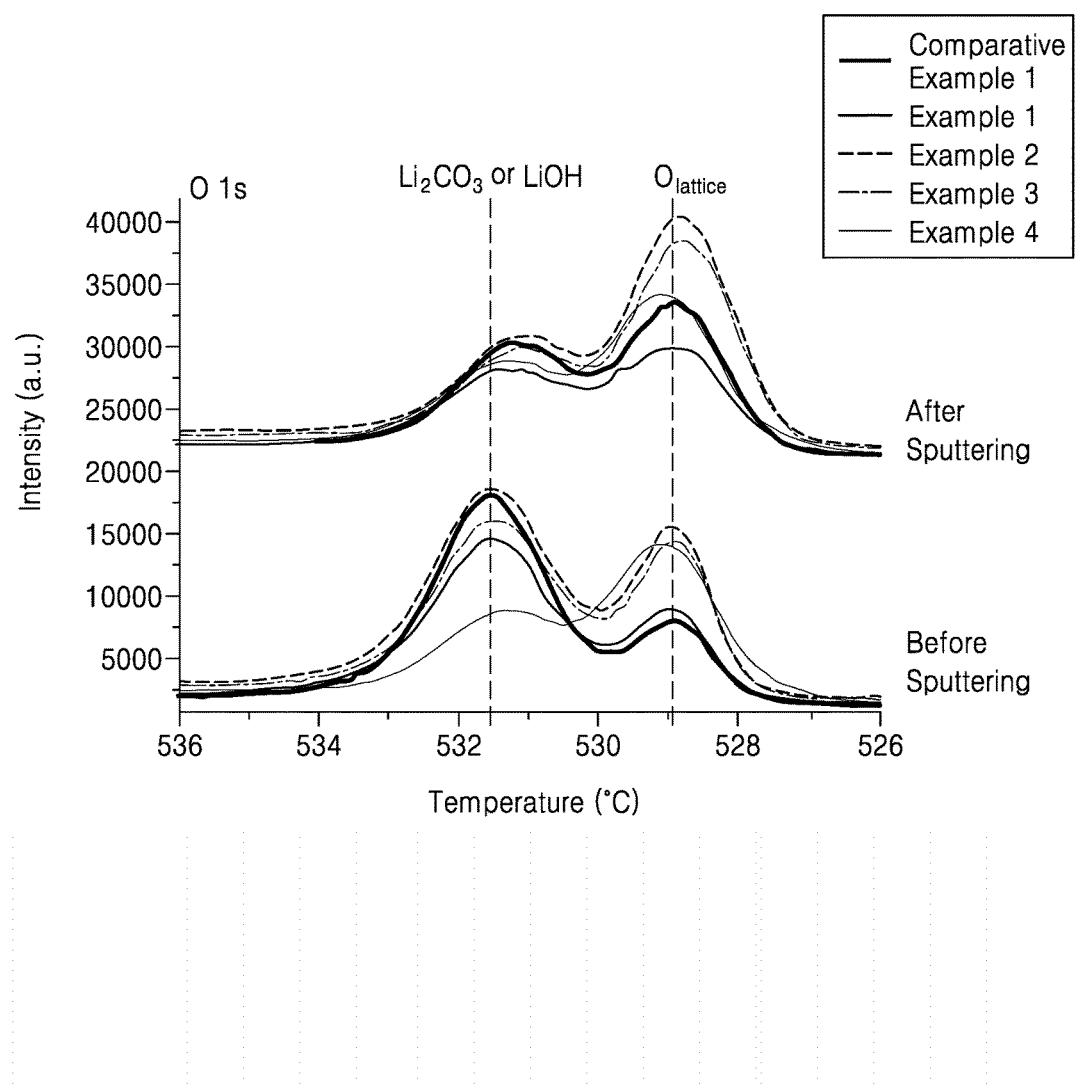
FIG. 8 is a graph of intensity (arbitrary units, a.u.) versus binding energy (electron volts, eV) showing the results of X-ray photoelectron analysis of the composite cathode active materials of Examples 1 to 4 and Comparative Example 1.

In FIG. 8, lower XPS spectra are the results of surface composition analysis of the composite active materials before sputtering, and upper XPS spectra are the results of inner composition analysis of the composite active materials after sputtering to etch away the surface of the composite active materials until their inside was exposed. The sputtering was performed by Ar$^+$ ion sputtering onto an area of about 1 mm$^2$ for about 2 minutes with a voltage of 1 kV.

In the surface XPS spectra before sputtering in FIG. 8, peaks at about 530 eV to about 533 eV originate from residual lithium such as Li$_2$CO$_3$ or LiOH, while peaks at about 528 eV to about 530 eV originate from oxygen (O$_{lattice}$) in the layered or spinel crystal structure and are unrelated to residual lithium.

TABLE 4

| Example | Peak intensity ratio $(I(Li_2CO_3)/I(O_{lattice}))$ before sputtering | Peak intensity ratio $(I(Li_2CO_3)/I(O_{lattice}))$ after sputtering | Peak intensity ratio difference before and after sputtering |
|---|---|---|---|
| Comparative Example 1 | 2.24 | 0.90 | 1.34 |
| Example 1 | 1.62 | 0.93 | 0.69 |
| Example 2 | 1.19 | 0.76 | 0.43 |
| Example 3 | 1.10 | 0.77 | 0.33 |
| Example 4 | 0.62 | 0.84 | −0.22 |

As shown in Table 4 and FIG. 8, the composite cathode active materials of Examples 1 to 4 had a reduced peak intensity ratio $(I(Li_2CO_3)/I(O_{lattice}))$ before sputtering, as compared to the composite cathode active material of Comparative Example 1, indicating reduction in residual surface lithium content. This is attributed to the formation of the coating layer by reaction of Co—NC with the residual lithium. A difference in peak intensity ratio $(I(Li_2CO_3)/I(O_{lattice}))$ before and after sputtering, i.e., a difference between the residual surface lithium content and the inner residual lithium content of the composite cathode active material was significantly smaller in the composite cathode active materials of Examples 1 to 4, compared to the composite cathode active material of Comparative Example 1.

Evaluation Example 8: Thermal Stability Evaluation

Thermal stabilities of the composite cathode active materials of Comparative Example 1 and Examples 1 to 4 were evaluated by differential scanning calorimetry (DSC). The results are shown in Table 5 and FIG. 9.

TABLE 5

| Example | Exothermic calorific value (J/g) |
|---|---|
| Comparative Example 1 | 2160 |
| Example 1 | 2147 |
| Example 2 | 1975 |
| Example 3 | 1901 |
| Example 4 | 1511 |

Referring to Table 5, the composite cathode active materials of Examples 1 to 4 were found to have a reduced exothermic calorific value, as compared to the composite cathode active material of Comparative Example 1.

Figure 9:
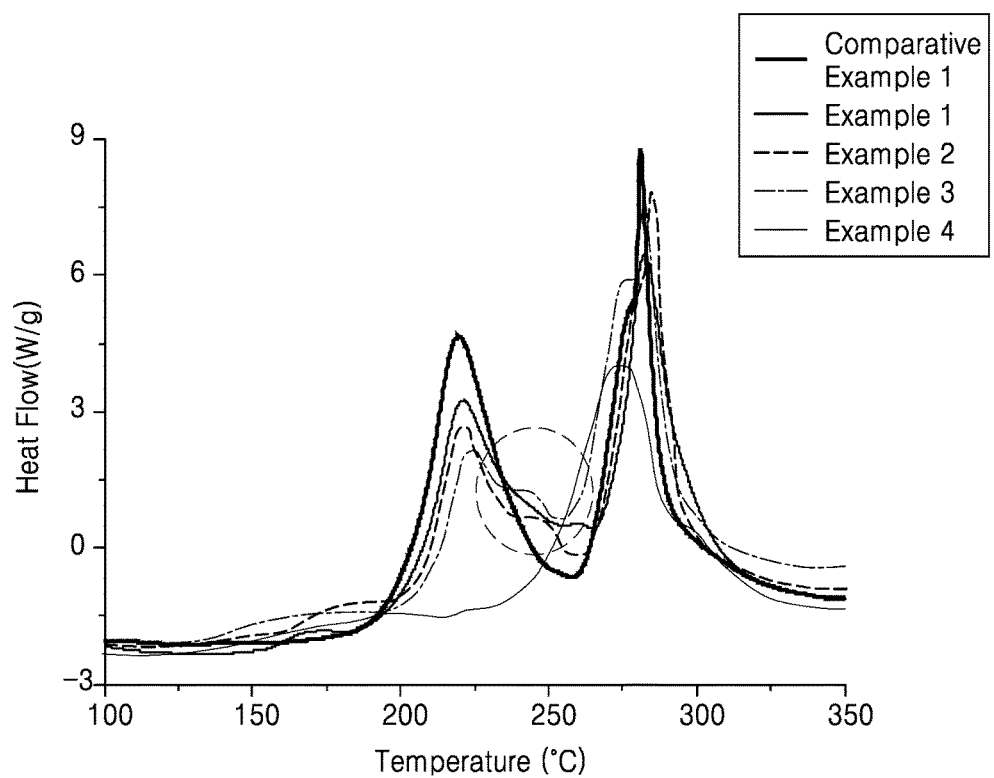
FIG. 9 is a graph of heat flow (Watts per gram, W/g) versus temperature (° C.) showing the results of differential scanning calorimetry ("DSC") analysis of the composite cathode active materials of Examples 1 to 4 and Comparative Example 1.

Referring to FIG. 9, the composite cathode active materials of Examples 1 to 4 were found to have a smaller low-temperature exothermic peak near about 225° C., with an exothermic peak shift at higher temperatures, indicating improved thermal stability as compared with the composite cathode active material of Comparative Example 1.

Evaluation Example 9: Charge-Discharge Characteristics Evaluation

The lithium batteries of Examples 8 to 14 and Comparative Examples 4 to 6 were charged at about 25° C. with a constant current ("CC") of 0.1 C rate until a voltage of 4.35 V (with respect to Li) was reached, and then with a constant voltage of 4.35 V (constant voltage mode) until a cutoff current of 0.05 C rate was reached, followed by discharging with a constant current of 0.1 C rate until a voltage of 2.8 V (with respect to Li) was reached ($1^{st}$ cycle, formation cycle).

After the $1^{st}$ cycle, the lithium batteries were charged at about 25° C. with a constant current of 0.33 C rate until a voltage of 4.35 V (with respect to Li) was reached, and then with a constant voltage of 4.35 V (constant voltage mode) until a cutoff current of 0.05 C rate was reached, followed by discharging with a constant current of 0.2 C rate until a voltage of 2.8 V (with respect to Li) was reached ($2^{nd}$ cycle).

After the $2^{nd}$ cycle, the lithium batteries were charged at about 25° C. with a constant current of 0.33 C rate until a voltage of 4.35 V (with respect to Li) was reached, and then with a constant voltage of 4.35 V (constant voltage mode) until a cutoff current of 0.05 C rate was reached, followed by discharging with a constant current of 0.2 C rate until a voltage of 2.8 V (with respect to Li) was reached. This cycle was repeated to the $60^{th}$ cycle. A rest time of about 10 minutes was allowed after each charge/discharge cycle among all of the charge/discharge cycles.

The charge-discharge test results are shown in Table 6. A capacity retention at the $50^{th}$ cycle and aninitial charge-discharge efficiency are defined as shown in Equations 1 and 2, respectively.

Capacity retention (%)=[Discharge capacity at $50^{th}$ cycle/Discharge capacity at $1^{st}$ cycle]×100%  Equation 1

Initial charge-discharge efficiency (%)=[Discharge capacity at $1^{st}$ cycle/Charge capacity at $1^{st}$ cycle]×100%  Equation 2

TABLE 6

| Example | Charge capacity at $1^{st}$ cycle (mAh/g) | Initial charge-discharge efficiency (%) | Discharge capacity at $2^{nd}$ cycle (mAh/g) | Capacity retention (%) | Residual surface lithium content (ppm) |
|---|---|---|---|---|---|
| Comparative Example 4 | 239 | 90 | 217 | 82.3 | 3,556 |
| Comparative Example 5 | 247 | 92 | 224 | 87.8 | 1,202 |
| Comparative Example 6 | 248 | 92 | 224 | 82.4 | 1,592 |
| Example 8 | 249 | 92 | 225 | 91.2 | 847 |
| Example 9 | 248 | 91 | 221 | 91.2 | 466 |
| Example 12 | 248 | 90 | 221 | 91.9 | 1,104 |
| Example 13 | 248 | 91 | 222 | 92.1 | 1,075 |
| Example 14 | 243 | 92 | 223 | 84.3 | 3,767 |

Referring to Table 6, the lithium batteries as coin cells of Examples 8 to 13, which included the composite cathode active material prepared through washing and a pyrolysis product of Co—NC coated on the surface thereof, were each found to have a remarkably improved capacity retention and a reduced residual surface lithium content, as compared to the lithium battery of Comparative Example 4 including the composite cathode active material prepared without washing and such a coating layer, the lithium battery of Comparative Example 5 including the composite cathode active material prepared through washing but having no coating layer, and the lithium battery of Comparative Example 6 including the composite cathode active material of which a surface was doped and/or coated with Co in a wet manner.

The lithium battery of Example 14 including the composite cathode active material prepared without washing and including a pyrolysis product of Co—NC coated on the surface thereof was found to have an improved capacity retention, as compared with the lithium battery of Comparative Example 4 including the composite cathode active material prepared without washing and such a coating.

In the lithium batteries of Comparative Examples 4 to 6, since the composite cathode active material includes only a layered crystal structure, 2-dimensional lithium ion transfer occurs in the layered crystal structure. However, in the lithium batteries of Examples 8 to 13, the composite cathode active material further included a shell as a coating layer on the layered crystal core, the shell having a spinel crystal structure with a 3-D lithium ion transfer pathway. A composite cathode active material further including a coating layer having a spinel crystal structure on the surface of a core having a layered crystal structure may provide an improved lithium ion transfer pathway, compared to a composite cathode active material including only the layered crystal structure. Accordingly, the lithium batteries of Examples 8 to 13 had improved charge-discharge characteristics, compared to the lithium batteries of Comparative examples 4 to 6, as shown in Table 6. That is, the shell as a coating layer having the spinel crystal structure may serve as a lithium ion conductor providing a lithium ion transfer pathway. The shell as a coating layer having the spinel crystal structure may have electrochemical activity, and thus may provide additional improved capacity.

Evaluation Example 10: Charge-Discharge Characteristics Evaluation

The lithium batteries of Examples 8 to 10 and Comparative Example 4 were charged at about 25° C. with a constant current of 0.1 C rate until a voltage of 4.8 V (with respect to Li) was reached, and then with a constant voltage of 4.8 V (constant voltage mode) until a cutoff current of 0.05 C rate was reached, followed by discharging with a constant current of 0.1 C rate until a voltage of 2.0 V (with respect to Li) was reached ($1^{st}$ cycle).

After the $1^{st}$ cycle were, the lithium batteries charged at about 25° C. with a constant current of 0.33 C rate until a voltage of 4.8 V (with respect to Li) was reached, and then with a constant voltage of 4.8 V (constant voltage mode) until a cutoff current of 0.05 C rate was reached, followed by discharging with a constant current of 0.2 C rate until a voltage of 2.0 V (with respect to Li) was reached. This cycle was repeated to the $60^{th}$ cycle. A rest time of about 10 minutes was allowed after each charge/discharge cycle among all the charge/discharge cycles.

The charge-discharge test results are shown in Table 7. The capacity retention at the $50^{th}$ cycle and the initial charge-discharge efficiency are as defined in Equations 1 and 2, respectively.

Figure 10A:
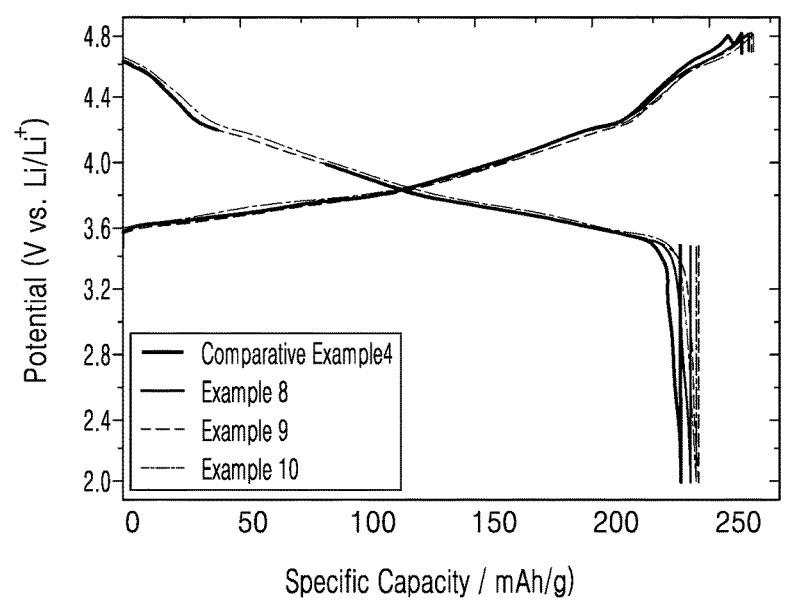
FIG. 10A is a graph of potential (volts versus Li/Li⁺) versus specific capacity (milliampere hours per gram, mAh/g) showing charge-discharge profiles of a 1$^{st}$ cycle of the lithium batteries of Examples 8 to 10 and Comparative Example 4.
Figure 10B:
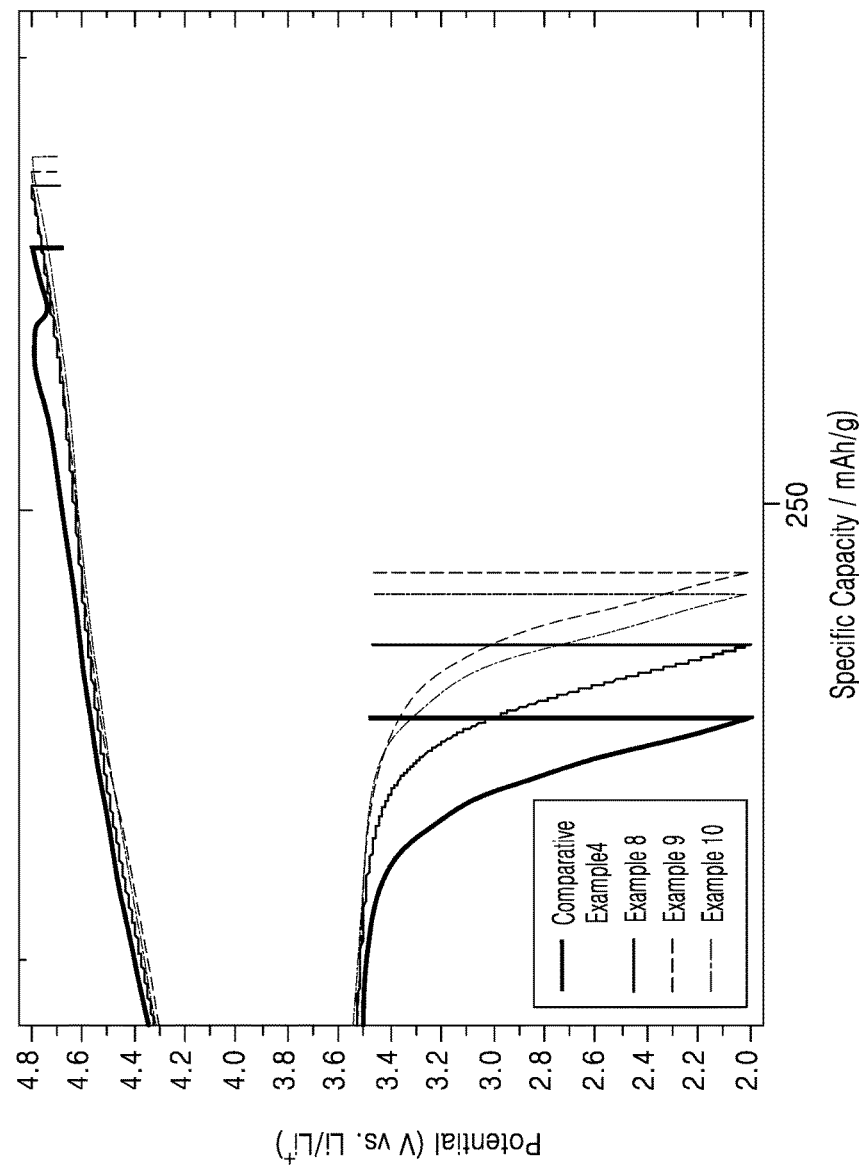
FIG. 10B is an enlarged view of FIG. 10A.

Charge-discharge profiles at the $1^{st}$ cycle are shown in FIGS. 10A and 10B.

TABLE 7

| Example | Charge capacity at $1^{st}$ cycle (mAh/g) | Initial charge-discharge efficiency (%) | Discharge capacity at $2^{nd}$ cycle (mAh/g) | Capacity retention (%) |
| --- | --- | --- | --- | --- |
| Comparative Example 4 | 264 | 90 | 222 | 83.7 |
| Example8 | 269 | 91 | 225 | 87.7 |

Referring to Table 7, the lithium battery of Example 8 was found to be improved in terms of charge capacity, discharge capacity, initial efficiency, and capacity retention, as compared to the lithium battery of Comparative Example 4.

Referring to FIGS. 10A and 10B, as compared to the lithium battery of Comparative Example 4, at a voltage of 4.5 V or greater during the $1^{st}$ cycle of charging to 4.8V, additional charge capacity was exhibited in the lithium batteries of Examples 8 to 10 due to the coating layer or shell region having the spinel crystal structure.

Figure 10C:
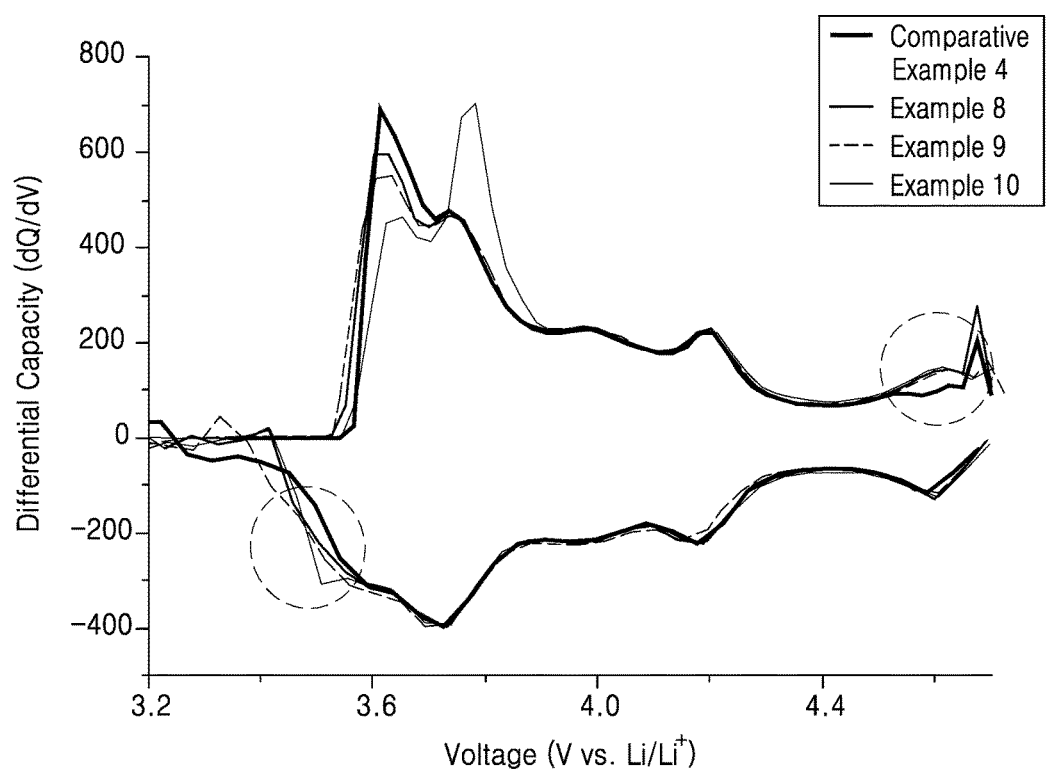
FIG. 10C is a graph of differential capacity (dQ/dV) versus voltage (volts versus Li/Li⁺), derived from FIG. 10A.

Consequently, this also led to additional discharge capacity in the lithium batteries of Examples 8 to 10. To more clearly support this result, the charge-discharge profile of FIG. 10A was represented as a plot of dQ/dV with respect to voltage (V) in FIG. 10C, wherein dQ/dV represents a differential value of charge quantity (Q) with respect to voltage (V). Referring to FIG. 10C, a peak due to the additional capacity exhibited by the coating layer or shell having the spinel crystal structure appeared at a voltage of about 4.5V or greater, indicating that the coating layer or shell region having the spinel crystal structure has electrochemical activity.

As described above, according to the one or more embodiments, using a composite cathode active material including a core and a shell on the core, the shell having a metal-doped spinel crystal structure, a lithium battery may have improved charge-discharge characteristics and improved thermal stability.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite cathode active material comprising:
   a polyhedral primary particle comprising
      a core comprising a first lithium transition metal oxide represented by Formula 1,
      a shell on a surface of the core, the shell having a spinel crystal structure and comprising a dopant, and
      a polyhedral pore extending from a first surface to an opposite second surface of the polyhedral primary particle:

$$Li_aMO_2 \qquad \text{Formula 1}$$

wherein, in Formula 1,
M comprises Ni and at least one non-nickel Group 4 to Group 13 element, wherein a content of Ni is about 70 mole percent or greater, based on a total content of M, $0.9 \leq a \leq 1.1$, and
wherein the first lithium transition metal oxide has a layered crystal structure belonging to an $R\bar{3}m$ space group.

2. The composite cathode active material of claim 1, wherein the dopant comprises at least one non-nickel Group 4 to Group 13 element.

3. The composite cathode active material of claim 1, wherein the shell comprises a second lithium transition metal oxide represented by Formula 2:

$$Li_{1-x}M''_y M'_z O_2 \quad \text{Formula 2}$$

wherein, in Formula 2,
M" comprises Ni and at least one non-nickel Group 4 to Group 13 element,
M' comprises at least one non-nickel Group 4 to Group 13 element, and
$0 \leq x \leq 0.05$, $0 \leq z \leq 0.06$, $1.0 \leq (y+z) \leq 1.06$.

4. The composite cathode active material of claim 3, wherein M' comprises Co, Zn, Fe, Cu, Mn, Zr, Ti, Mg, or a combination thereof.

5. The composite cathode active material of claim 3, wherein the second lithium transition metal oxide has electrochemical activity.

6. The composite cathode active material of claim 1, wherein the shell has a thickness of about 100 nanometers or less.

7. The composite cathode active material of claim 1, wherein a content of the shell is about 6 weight percent or less, based on a total weight of the composite cathode active material.

8. The composite cathode active material of claim 1, wherein the spinel crystal structure belongs to an $Fd\bar{3}m$ space group.

9. The composite cathode active material of claim 1, wherein a peak intensity ratio of an intensity of a (003) peak to an intensity of a (104) peak of the composite cathode active material is less than a peak intensity ratio of an intensity of a (003) peak to an intensity of a (104) peak of the core.

10. The composite cathode active material of claim 1, wherein a maximum peak intensity in a Raman spectrum of the composite cathode active material is positioned at about 530 inverse centimeters or greater.

11. The composite cathode active material of claim 1, wherein a peak intensity ratio of an intensity of a peak at about 530 electron volts to 533 electron volts to an intensity of a peak at about 528 electron volts to about 530 electron volts in a surface X-ray photoelectron spectrum of the composite cathode active material is about 2 or less.

12. The composite cathode active material of claim 1, wherein the composite cathode active material comprises mesopores having a diameter of about 1 nanometer to about 100 nanometers, and wherein the mesopores have an average volume of about 0.001 cubic centimeters per gram.

13. The composite cathode active material of claim 1, wherein the composite cathode active material has a specific surface area of about 0.48 square meters per gram or greater.

14. A composite cathode active material comprising:
a primary particle comprising
a core comprising a first lithium transition metal oxide represented by Formula 1,
a shell on a surface of the core, the shell having a spinel crystal structure and comprising a dopant, and
a polyhedral pore extending from a first surface to an opposite second surface of the polyhedral primary particle:

$$Li_a MO_2 \quad \text{Formula 1}$$

wherein, in Formula 1, M comprises Ni and at least one non-nickel Group 4 to Group 13 element, wherein a content of Ni is about 70 mole percent or greater, based on a total content of M, and $0.9 \leq a \leq 1.1$,
wherein the first lithium transition metal oxide has a layered crystal structure belonging to an $R\bar{3}m$ space group; and
wherein a sum of peak intensities defined as (Dopant peak intensity+Co peak intensity)/(Mn peak intensity)

before and after $Ar^+$ sputtering when analyzed by surface X-ray photoelectron spectroscopy of the composite cathode active material is about 5 or greater.

15. The composite cathode active material of claim 14, wherein the dopant comprises at least one non-nickel Group 4 to Group 13 element.

16. The composite cathode active material of claim 14, wherein the shell comprises a second lithium transition metal oxide represented by Formula 2:

$$Li_{1-x}M''_y M'_z O_2 \quad \text{Formula 2}$$

wherein, in Formula 2,
M" comprises Ni and at least one non-nickel Group 4 to Group 13 element,
M' comprises at least one non-nickel Group 4 to Group 13 element,
$0 \leq x \leq 0.05$, $0 \leq z \leq 0.06$, and $1.0 \leq (y+z) \leq 1.06$.

17. The composite cathode active material of claim 14, wherein M' comprises Co, Zn, Fe, Cu, Mn, Zr, Ti, Mg, or a combination thereof.

18. The composite cathode active material of claim 14, wherein the first lithium transition metal oxide is represented by Formula 3:

$$Li_a Ni_b M1_c M2_d M3_e O_2 \quad \text{Formula 3}$$

wherein, in Formula 3,
M1, M2, and M3 are different and each independently comprises manganese, vanadium, chromium, iron, cobalt, zirconium, rhenium, aluminum, boron, germanium, ruthenium, tin, titanium, niobium, molybdenum, or platinum,
$0.9 \leq a \leq 1.1$, $0.7 < b < 1.0$, $0 < c < 0.3$, $0 < d < 0.4$, $0 \leq e < 0.3$, and $b+c+d+e=1$.

19. The composite cathode active material of claim 14, wherein the first lithium transition metal oxide is represented by Formula 4:

$$Li_a Ni_b Co_c Mn_d M3'_e O_2 \quad \text{Formula 4}$$

wherein, in Formula 4, M3' comprises vanadium, chromium, iron, zirconium, rhenium, aluminum, boron, germanium, ruthenium, tin, titanium, niobium, molybdenum, or platinum,
$0.9 \leq a \leq 1.1$, $0.7 < b < 1.0$, $0 < c < 0.3$, $0 < d < 0.4$, $0 \leq e < 0.3$, and $b+c+d+e=1$.

20. A cathode comprising a composite cathode active material according to claim 1.

21. A lithium battery comprising:
the cathode of claim 20,
an anode, and
an electrolyte between the cathode and the anode.

22. A method of preparing a composite cathode active material, the method comprising:

mixing a metal-organic framework and a first lithium transition metal oxide represented by Formula 1 to prepare a mixture $$Li_aMO_2 \qquad \text{Formula 1}$$

wherein, in Formula 1,

M comprises Ni and at least one non-nickel Group 4 to Group 13 element, a content of Ni is about 70 mole percent or greater, based on a total content of M, and $0.9 \leq a \leq 1.1$, and wherein the first lithium transition metal oxide has a layered crystal structure belonging to an $R\overline{3}m$ space group; and thermally treating the mixture under an oxidizing atmosphere at about 650° C. to about 800° C. for about 3 hours to about 20 hours to prepare the composite cathode active material, wherein the composite cathode active material comprises a polyhedral primary article comprising:

a core comprising the first lithium transition metal oxide, a shell on a surface of the core, the shell having a spinel crystal structure and comprising a dopant, and a polyhedral pore extending from a first surface to an opposite second surface of the polyhedral primary particle.

23. The method of claim 22, wherein the metal-organic framework comprises Co, Zn, Fe, Cu, Ni, Mn, Zr, Ti, Mg, or a combination thereof.

24. The method of claim 22, wherein the metal-organic framework comprises a polyhedral primary particle, and wherein the polyhedral primary particle has a particle diameter of about 2 nanometers to about 300 nanometers.

25. The method of claim 22, wherein an amount of the metal-organic framework in the mixture is about 6 parts by weight or less, based on 100 parts by weight of the first lithium transition metal oxide.

26. The composite cathode active material of claim 14, wherein the shell is a reaction product of the first lithium oxide and a metal organic framework.

* * * * *